United States Patent
Eda

(10) Patent No.: US 10,307,677 B2
(45) Date of Patent: *Jun. 4, 2019

(54) COMPUTER CONTROL METHOD, CONTROL PROGRAM AND COMPUTER

(71) Applicant: Gree, Inc., Tokyo (JP)

(72) Inventor: Taiki Eda, Tokyo (JP)

(73) Assignee: Gree, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,639

(22) Filed: Jun. 30, 2017

(65) Prior Publication Data

US 2017/0296926 A1  Oct. 19, 2017

Related U.S. Application Data

(63) Continuation of application No. 15/393,646, filed on Dec. 29, 2016, which is a continuation of application
(Continued)

(30) Foreign Application Priority Data

Sep. 27, 2013 (JP) ................... 2013-202721
Apr. 9, 2014 (JP) ................... 2014-080554

(51) Int. Cl.
  *A63F 9/24* (2006.01)
  *A63F 13/537* (2014.01)
  (Continued)

(52) U.S. Cl.
  CPC ............ *A63F 13/537* (2014.09); *A63F 13/31* (2014.09); *A63F 13/55* (2014.09); *A63F 13/63* (2014.09); *A63F 13/822* (2014.09); *A63F 13/92* (2014.09)

(58) Field of Classification Search
  USPC ....................................... 463/29–42
  See application file for complete search history.

(56) References Cited

U.S. PATENT DOCUMENTS 6,398,646 B1  6/2002  Wei et al.
6,454,653 B1  9/2002  Kawazu
(Continued)

FOREIGN PATENT DOCUMENTS

DE      60035382 T2    10/2007
EP       1040855 A2    10/2000
(Continued)

OTHER PUBLICATIONS

Japanese Office Action dated Sep. 12, 2017 in Patent Application No. 2015-248965 (with English Translation).
(Continued)

*Primary Examiner* — Masud Ahmed
(74) *Attorney, Agent, or Firm* — Oblon, McClelland, Maier & Neustadt, L.L.P.

(57) ABSTRACT

Provided is a method for controlling a computer, etc., which makes it possible to improve the usability of city building games. The computer is provided with a storage unit configured to store game contents arranged within a game space, positions of the game contents, and a template defining positions of one or more of game contents, and progresses a game by arranging the game contents within the game space based on a command by a player. The method includes when the template is applied to a predetermined area within the game space based on the command by the player, moving, by the computer, the game contents arranged within the game space to the positions of the game contents defined by the template.

20 Claims, 15 Drawing Sheets

Related U.S. Application Data

No. 14/983,894, filed on Dec. 30, 2015, now Pat. No. 9,597,594, which is a continuation of application No. PCT/JP2014/075673, filed on Sep. 26, 2014.

(51) Int. Cl.
| | |
|---|---|
| A63F 13/822 | (2014.01) |
| A63F 13/55 | (2014.01) |
| A63F 13/63 | (2014.01) |
| A63F 13/92 | (2014.01) |
| A63F 13/31 | (2014.01) |

(56) References Cited

U.S. PATENT DOCUMENTS

| | | | | |
|---|---|---|---|---|
| 7,628,704 | B1* | 12/2009 | Uhlir | A63F 13/79 463/40 |
| 7,921,136 | B1* | 4/2011 | Shuman | G01C 21/26 707/802 |
| 8,376,857 | B1* | 2/2013 | Shuman | A63F 13/332 463/42 |
| 8,764,534 | B1* | 7/2014 | DeSanti | A63F 13/335 463/31 |
| 8,821,260 | B1* | 9/2014 | DeSanti | A63F 13/00 463/25 |
| 8,845,423 | B1* | 9/2014 | Monahan | A63F 13/00 463/29 |
| 9,022,869 | B1* | 5/2015 | DeSanti | G07F 17/3225 463/42 |
| 2008/0078758 | A1* | 4/2008 | Shimura | A63F 13/10 219/717 |
| 2010/0130285 | A1* | 5/2010 | Luciano, Jr. | G07F 17/323 463/30 |
| 2010/0160039 | A1* | 6/2010 | Nathan | A63F 13/12 463/31 |
| 2010/0227682 | A1* | 9/2010 | Reville | A63F 13/12 463/29 |
| 2011/0319170 | A1* | 12/2011 | Shimura | H04W 4/203 463/42 |
| 2012/0090021 | A1* | 4/2012 | Luh | G06F 9/468 726/17 |
| 2012/0295702 | A1* | 11/2012 | Otero | A63F 13/77 463/31 |
| 2013/0217489 | A1* | 8/2013 | Bronstein Bendayan | A63F 13/12 463/31 |
| 2013/0288757 | A1* | 10/2013 | Guthridge | A63F 13/12 463/2 |
| 2015/0005051 | A1* | 1/2015 | Smalley | A63F 13/30 463/25 |

FOREIGN PATENT DOCUMENTS

| | | |
|---|---|---|
| EP | 1082984 A2 | 3/2001 |
| EP | 1 574 238 A1 | 9/2005 |
| EP | 2 444 134 A1 | 4/2012 |
| JP | 2000-279637 A | 10/2000 |
| JP | 2001-079269 | 3/2001 |
| JP | 2002-052249 A | 2/2002 |
| JP | 2007-215757 A | 8/2007 |
| JP | 2007-296199 A | 11/2007 |
| JP | 2009-207624 A | 9/2009 |
| JP | 2009-233098 A | 10/2009 |
| JP | 2009-247474 A | 10/2009 |
| JP | 2010-125023 | 6/2010 |
| JP | 2010-125023 A | 6/2010 |
| JP | 2010-125222 | 6/2010 |
| JP | 2011-000170 A | 1/2011 |
| JP | 2011-142997 | 7/2011 |
| JP | 2011-161042 A | 8/2011 |
| JP | 2012-065831 | 4/2012 |
| JP | 2013-165747 | 8/2013 |
| JP | 5525096 | 4/2014 |
| JP | 5676032 B | 1/2015 |
| JP | 2015-066141 A | 4/2015 |
| WO | WO 2011/125265 A1 | 10/2011 |

OTHER PUBLICATIONS

Konami Official Guide, "Perfect Series Palpitation Memorial 2 Perfect Guide", Konami Corporation, Dec. 20, 1999, first edition, P.31 and Partial English Translation, 5 pages.

Konami Official Guide, "Perfect Capture Series 47 Palpitation Memorial 2 Authorized-Guidebook Uncut Text", Konami Corporation, Jul. 10, 2001, 6$^{th}$ printing, P.53 and Partial English Translation, 5 pages.

Office Action for corresponding JP Application No. 2015-022433 dated Feb. 23, 2016 (3 pages) (with English Translation).

Monster Hunter Frontier Online, Frontier Communication Forward. 3, Enterbrain, Inc., Feb. 15, 2012 p. 126 (with partial English translation).

The Convenience Store 2—Chain Store Development Throughout Japan—Game Winning Method Futabasha Publishers Ltd., Apr. 15, 1998, pp. 11-14, Sections for "Read Interior" and "Save Interior" (with partial English translation).

The Convenience Store DS, 1$^{st}$ Edition, Shinkigensha Co., Ltd. Dec. 4, 2008, pp. 14-35 (with partial English translation).

Dengeki Play Station, Phantasy Star Online 2, vol. 19, ASCII Media Works Corporation, No. 21, Jun. 27, 2013, pp. 116-119, section "My Room Function, Layout Pattern Switching". (with partial English translation).

Decision of Admiral, Super Guide book, Fifth Edition, Koei Co., Ltd, Mar. 25, 1993, pp. 8-9, section "Scenario Selection Screen" (with partial English translation).

Office Action for corresponding JP Application No. 2015-123316, dated Oct. 7, 2016 (2 pages) (with English translation).

Nobunyaga No Yabou, Nekobukan, Koei Tecmo Games Co., Ltd., Jan. 27, 2012, Second printing, pp. 111 and 126.

Office Action for corresponding JP Application No. 2015-160034 dated Mar. 1, 2016 (4 pages). (with English translation).

Office Action for corresponding JP Application No. 2015-160035 dated Mar. 1, 2016 (6 pages). (with English translation).

Office Action for corresponding JP Application No. 2015-160035 dated May 17, 2016 (6 pages). (with English translation).

Office Action for corresponding JP Application No. 2015-160036 dated Mar. 1, 2016 (9 pages). (with English translation).

Office Action for corresponding JP Application No. 2015-160038 dated Mar. 1, 2016 (6 pages). (with English translation).

Office Action for corresponding JP Application No. 2015-160038 dated May 17, 2016 (2 pages). (with English translation).

Nobunyaga No Yabou, Nekobukan, Koei Tecmo Games Co., Ltd., Jan. 27, 2012, Second printing, pp. 112 and 113.

Nobunaga No Yabou/Tendou Handbook The second volume, Koei Co., Ltd., Nov. 1, 2009, First printing, pp. 60 and 61.

International Search Report for corresponding international application No. PCT/JP2014/075673; dated Oct. 21, 2014 (3 pages) (with English translation).

Final Rejection for corresponding JP Application No. 2015-123316 dated Sep. 30, 2015 (5 pages) (with English translation).

Office Action for corresponding JP Application No. 2015-123331 dated Jul. 6, 2015 (5 pages). (with English Translation).

Office Action for corresponding JP Application No. 2015-160032 dated Sep. 30, 2015 (13 pages). (with English Translation).

Office Action for corresponding JP Application No. 2015-160033 dated Oct. 5, 2015 (15 pages). (with English Translation).

Office Action for corresponding JP Application No. 2015-160034 dated Oct. 5, 2015 (13 pages). (with English Translation).

Office Action for corresponding JP Application No. 2015-160035 dated Sep. 30, 2015 (15 pages). (with English Translation).

Office Action for corresponding JP Application No. 2015-160036 dated Sep. 30, 2015 (15 pages). (with English Translation).

Office Action for corresponding JP Application No. 2015-160037 dated Sep. 30, 2015 (16 pages). (with English Translation).

Office Action for corresponding JP Application No. 2015-160038 dated Sep. 30, 2015 (15 pages). (with English Translation).

(56) References Cited

OTHER PUBLICATIONS

Office Action for corresponding JP Application No. 2015-123316 dated Jul. 6, 2015 (10 pages). (with English Translation).
Office Action for corresponding JP Application No. 2014-080554 dated Sep. 9, 2015 (4 pages). (with English Translation).
Office Action for corresponding JP Application No. 2014-080554 dated Jun. 19, 2014 (9 pages). (with English Translation).
Office Action for corresponding JP Application No. 2013-202721 dated Nov. 21, 2013 (7 pages). (with English Translation).
Office Action for corresponding JP Application No. 2014-259251 dated Mar. 6, 2015 (7 pages). (with English Translation).
Konami Official Guide for World Soccer Winning Eleven 2000 U-23, Konami Co., Ltd., on Dec. 8, 2000, Second Printing, p. 019.
Capcom, Jun. 19, 2007, Monster Hunter Frontier G, PC version, online manual, [Jun. 9, 2014 search], interface Netto <URL: http://cog-members.mhf-g.jp/sp/manual/page164.html # bf2e27ce883c8ca097adc4a41 fl 14562>.
A—Train7 Official Expert Guidebook—Simulation Game, Railroad Management, Urban Development, published Mar. 22, 2006 (with English translation).
A—Train9 Version 2.0 Professional Edition—Official Guidebook, published Dec. 19, 2012. (with English translation).
Frontier communication—Monster Hunter Frontier Online Forward. 3, published Feb. 15, 2012.
https://en.wikipedia.org/w/index.php?title=SimCity&oldid=572690969.
https://en.wikipedia.org/w/index.php?title=Clash of Clans&oldid=572472971.
PC Game Review of Medieval Lords, Aug. 2005. URL: http://game.watch.impress.co.jp/docs/20050801/medieval.htm (with English Translation).
Partial Supplementary European Search Report Application No. 14848832.3, dated Apr. 19, 2017, 8 pages.
Singapore Office Action in Application No. 11201602230Q dated Jun. 15, 2017, 11 pages.
European Search Report dated Jul. 28, 2017 issued in corresponding European Patent Application No. 14848832.3 (16 pages).
Office Action for corresponding JP application No. 2016-255511 dated Apr. 25, 2017, 15 pages (with English translation).
Office Action for corresponding JP application No. 2016-255512 dated Apr. 25, 2017, 12 pages (with English translation).
Taku Yamazaki et al., Super Family Computer Fire Emblem: Lineage of Crusades Walkthrough Guide Book, T2 Publishing Co., Ltd., Jul. 20, 1996, $2^{nd}$ impression, 5 pages.
V Jump Books Game Series: Final Fantasy Tactics, Shueisha, Inc., Jan. 18, 1998, $3^{rd}$ impression, 5 pages.
Website Fundamental Information of Clash of Clans for Beginners, 9 pages.
Website Information on Clash of Clans Data Linkage between iPhone and iPad, http://www.appbank.net/2013/06/25iphone-application/627513.php, 6 pages, Sep. 8, 2017.
Play Manual of Hotel Giant 2. 32 pages.
Website Clash of Clans Wiki Village Edit Mode, http://clashofclans.wikia.com/wiki/Village_Edit_Mode_07/24/2017, 2 pages.
Play Manual of Winning Eleven 2011, 20 pages.
Play Manual of SidMeiers Civilization, 116 pages.
Japanese Office Action dated Mar. 20, 2018 in Japanese Patent Application No. 2017-242679 with translation.
Yoshie Hori et al.; "The Convenience Store DS: Adult Management Skills Training Official Perfect Guide", Shinkigensha Co., Ltd., first issue, Dec. 4, 2008, P4, 8, 35 with translation.
R. Barba, et al., "Star Craft, Wings of Liberty", Bradygames, Official Strategy Guide, ISBN-13: 978-074401128-9, ISBN-10: 074401128-0, Blizzard Entertainment, Inc.. 2010, Total pages submitted herewith: 5 pages (The first page: the cover page, the second and third pages: pp. 188 and 196 of this reference, the fourth and fifth pages: the back cover pages).
Japanese Office Action dated May 29, 2018 in Japanese Patent Application No. 2017-242679 with translation.

Petition for Post-Grant Review of U.S. Pat. No. 9,597,594 dated Nov. 7, 2017 by Petitioner's Counsel.
Austin Lockwood. A Guide to Correspondence Chess in Wales, Welsh Correspondence Chess Federation, Jun. 17, 2016, Updated Feb. 9, 2017 by Austin Lockwood <ULR: https://www.welshccf.org.uk/content/19>.
Bryce D. Avery, Correspondence chess in America. ISBN 978-0-7864-7396-0. © 2000 Bryce D. Avery. All rights reserved., pp. ix, x, 1-3.
Microsoft Computer Dictionary, 4th edition, Microsoft Press. A Division of Microsoft Corporation, ISBN 0-7356-0615-3, 1999, p. 102.
USPTO Memorandum dated May 4, 2016, titled "Formulating a Subject Matter Eligibility Rejection and Evaluating the Applicant's Response to a Subject Matter Eligibility Rejection" from Deputy Commissioner for Patent Examination Policy.
Patent Owner's Preliminary Response dated Feb. 20, 2018 by Counsel for Patent Owner.
Jul. 2015 Update Appendix 1: Examples dated Jul. 30, 2015 by USPTO.
Petitioner's Reply to Patent Owner's Preliminary Response dated Mar. 21, 2018 by Petitioner's Counsel.
Patent Owner's Surreply to Petitioner's Reply to Patent Owner's Preliminary Response dated Mar. 28, 2018 by Counsel for Patent Owner.
Decision dated May 1, 2018, Granting Institution of Post-Grant Review 35 U.S.C. § 324(a) by Patent Trial and Appeal Board.
Patent Owner's Response dated Jul. 3, 2018, by Counsel for Patent Owner.
Declaration of David Crane dated Jul. 3, 2018.
"Wikia, Clash of Clans WiKi Navigation", captured by Wayback Machine, submitted Jul. 27, 2017, 4 pages.
Declaration of Tommi Suvinen, submitted Sep. 14, 2017 in Case No. H29 YO 22046 of JP Patent No. 5676032, 56 pages.
Declaration of Marika Appel, submitted Sep. 14, 2017 in Case No. H29 YO 22046 of JP Patent No. 5676032, 41 pages.
"Mastermind's In-Game Builder idea (with LOADS of pictures!)", captured by Wayback Machine, printed Sep. 11, 2017, https://web.archive.org/web/20130915081112/http://forum.supercell.net:80/showthread.php/149687-Mastermind-s-In-Game-Builder-Idea-(with-LOADS-of-pictures!), 16 pages.
"Thread: Mastermind's In-Game Builder idea (with LOADS of pictures!)", captured by Wayback Machine, submitted Sep. 15, 2017, http://forum.supercell.net:80/showthread.php/149687-Mastermind-s-In-Game-Builder-Idea-(with-LOADS-of-picutres!), 13 pages.
"Mastermind's In-Game Builder idea (with LOADS of pictures!)", captured by Wayback Machine, printed Sep. 12, 2017, https://forum.supercell/com/showthread.php/149687-Mastermind-s-In-Game-Builder-Ideas-(with-LOADS-of-picutres!), 13 pages.
Takeo Nasu, A Report on Operation Check of Hotel Giants 2, submitted Oct. 17, 2017 in Case No. H29 YO 22046 of JP Patent No. 5676032, 8 pages.
Shinya Kamata, A Report on Operation Check of Winning Eleven 2011, submitted Oct. 17, 2017 in Case No. H29 YO 22046 of JP Patent No. 5676032, 7 pages.
Declaration of Sean Olesluk, submitted Dec. 14, 2017 in Case No. H29 YO 22046 of JP Patent No. 5676032, 63 pages.
Takeo Nasu, A Report on Operation Check of Hotel Giants 2 ver.2, submitted Jan. 26, 2018 in Case No. H29 YO 22046 of JP Patent No. 5676032, 4 pages.
"StarCraft II: Wings of Liberty, Overview", captured by Wayback Machine, submitted Sep. 15, 2017, http://gamewaise.co/games/36254/ StarCraft-II-Wings-of-Liberty/Overview, 2 pages.
"StarCraft II: Wings of Liberty, Gameplay", captured by Wayback Machine, submitted Sep. 15, 2017, http://gamewaise.co/games/36254/ StarCraft-II-Wings-of-Liberty/Gameplay, 2 pages.
"StarCraft II: Wings of Liberty, Marine", captured by Wayback Machine, submitted Sep. 15, 2017, http://gamewaise.co/games/36254/ StarCraft-II-Wings-of-Liberty/Units/Terran/Marine, 3 pages.
"StarCraft II: Wings of Liberty, Structures", captured by Wayback Machine, submitted Sep. 15, 2017, https://gamewaise.co/games/36254/ StarCraft-II-Wings-of-Liberty/Structures, 2 pages.

(56) References Cited

OTHER PUBLICATIONS

"StarCraft II: Wings of Liberty, Terran", captured by Wayback Machine, submitted Sep. 15, 2017, http://gamewaise.co/games/36254/ StarCraft-II-Wings-of-Liberty/Structures/Trerran, 2 pages.
"StarCraft II: Wings of Liberty, Missile Turret", captured by Wayback Machine, submitted Sep. 15, 2017, http://gamewaise.co/games/36254/ StarCraft-II-Wings-of-Liberty/Structures/Terran/Missile Turret, 2 pages.
"StarCraft II: Arcade", captured by Wayback Machine, submitted Sep. 15, 2017, us.battle.net/sc2/en/game/maps-and-mods/, 3 pages.
"StarCraft II: Map Making Tutorials, Terrain Module, Introduction", captured by Wayback Machine, submitted Sep. 15, 2017, http://us.battle.net/sc2/en/game/maps-and-mods/tutorials/terrain/1, 3 pages.
"StarCraft II: Map Making Tutorials, Terrain Module, Place some units", captured by Wayback Machine, submitted Sep. 15, 2017, http://us.battle.net/sc2/en/game/maps-and-mods/tutorials/terrain/3, 2 pages.
"StarCraft II: Map Making Tutorials, Terrain Module, Publishing", captured by Wayback Machine, submitted Sep. 15, 2017, http://us.battle.net/sc2/en/game/maps-and-mods/tutorials/publishing, 6 pages.
Takeo Nasu, A Report on Operation Check of StarCraft II, ver. 1, submitted Dec. 21, 2017 in Case No. H29 YO 22172 of JP Patent No. 5903518, 6 pages.
"StarCraft II: Wings of Liberty, Map Making Tutorials, Terrain Module, Publishing", captured by Wayback Machine, submitted Jan. 9, 2018, http://us.battle.net:80/sc2/en/game/maps-and-mods/tutorials/publishing, 5 pages.
"StarCraft II: Wings of Liberty, Map Making Tutorials, Terrain Module, Map Properties", captured by Wayback Machine, submitted Jan. 9. 2015, http://us.battle.net:80/sc2/en/game/maps-and-mods/tutorials/terrain/5, 5 pages.
"Play Station 3 System Software 4.00, User's Guide, Save Data", captured by Wayback Machine, submitted Oct. 17, 2017, http://manuals.playstation.net/document/jp/ps3/current/game/3savedata.html, 2 pages.
Declaration of Eric Gray Submitted Nov. 8, 2017 in Case No. H29 YO 22041 of JP Patent No. 5911992, 3 pages.
Declaration of Antti Takala submitted Nov. 9, 2017 in Case No. H29 YO 22041 of JP Patent No. 5911992, 19 pages.
Takeo Nasu, A Report of Operation Check of Clash of Clans ver. 5.2 on Actual Device, submitted Nov. 10, 2017 in Case No. H29 YO 22041 of JP Patent No. 5911992, 6 pages.
Takeo Nasu, A Report on Operation Check of StarCraft II, submitted Oct. 20, 2017 in Case No. H29 YO 22163 of JP Patent No. 5952946, 3 pages.
"StarCraft 2 Beta: Battle.Net Impressions". printed Sep. 28. 2017, https://gamerant.com/starcraft-2-beta-battlenet-impressions-paul-11666/3/, 5 pages.
"StarCraft ll, Map Making Tutorials, Terrain Module, Map Properties", captured by Wayback Machine, submitted Dec. 26, 2017, http://us.battle.net:80/sc2/en/game/maps-and-mods/tutorials/terrain/5, 7 pages.
Nobuhiko Suzuki, A Report on Operation Check of Civilization IV, submitted May 8, 2018 in Case No. H29 WA 34031 of JP Patent No. 5952946, 4 pages.
"Civilization IV, weekly article, "Bummeido, the snack at 3AM" vol. 1", printed Sep. 21, 2017, http://www.4gamer.net/weekly/civ4_001.shtml, 6 pages.
"Tips of Backup Technics for Saved Data of Popular Game Applications, before Purchasing New Phone", Sep. 16, 2013. http://www.appbank.net/2013/09/16/iphone-news/66683.php, 12 pages.
"How to migrate Data of Clash of Clans from iPhone5 to iPad mini", Jul. 25, 2013, https://blogs.yahoo.co.jp/syuel1009/68066740.html, 4 pages.
"Clash of Clans, Playing it lightly with iPhone Outside, Playing it deliberately with iPad at Home, and Setting of Notification", Jul. 5, 2013, http://kitchencompany.jp/post-3464/, 3 pages.
Supercell's First Brief, submitted Jul. 6, 2018 in Case No. H30 WA 10447 of JP Patent No. 5676032, 87 pages.
Nobuhiko Suzuki, A Report of Operation Check of Hotel Giants 2 on Actual Device, submitted Jul. 6, 2018 in Case No. H30 WA 10447 of JP Patent No. 5676032, 7 pages.
Supercell's First Brief, submitted Jul. 20, 2018 in Case No. H30 WA 10446 of JP Patent No. 5903517, 78 pages.
Supercell's First Brief, submitted Jan. 26, 2018 in Case No. H29 WA 34031 of JP Patent No. 5952946, 45 pages.
Gree's First Brief, submitted Feb. 5, 2018 in Case No. H29 WA 34031 of JP Patent No. 5952946, 112 pages.
Supercell's Third Brief, submitted Mar. 16, 2016 in Case No. H29 WA 34031 of JP Patent No. 5952946, 18 pages.
Gree's Second Brief, submitted May 16, 2016 in Case No. H29 WA 34031 of JP Patent No. 5952946, 16 pages.
Supercell's Fourth Brief, submitted May 8, 2018 in Case No. H29 WA 34031 of JP Patent No. 5952946, 72 pages.
Supercell's First Brief, submitted Feb. 6, 2018 in Case No. H29 WA 40193 of JP Patent No. 5952947, 60 pages.
Gree's First Brief, submitted Feb. 16, 2018 in Case No. H29 WA 40193 of JP Patent No. 5952947, 37 pages.
Supercell's Third Brief, submitted Mar. 23, 2018 in Case No. H29 WA 40193 of JP Patent No. 5952947, 26 pages.
Supercell's First Brief, submitted Jun. 25, 2018 in Case No. H30 WA 11146 of JP Patent No. 5953448, 72 pages.
Supercell's Third Brief, submitted Jul. 18, 2018 in Case No. H30 WA 11146 of JP Patent No. 5953448, 45 pages.
Gree's Second Brief, submitted Sep. 4. 2018 in Case No. H30 WA 11146 of JP Patent No. 5953448, 8 pages.
Motion for Preliminary Injunction, submitted Mar. 29, 2018 in Case No. H30 YO 22032 of JP Patent No. 5676032, 31 pages.
"Internet Archive's Terms of Use, Privacy policy and copyright policy", Archive.org, Dec. 31, 2014, https://archive.org/about/terms.php, 3 pages.
"Internet News of Stock, Nikkei.com", captured by Wayback Machine, printed Oct. 20, 2017, http://web.archive.org/web/20171017091811/https://nikkei.com/markets/kabu/, 1 page.
"Internet. News of Stock, Nikkei.com", Oct. 17, 2017, https://www.nikkei.com/article/DGXLAS3LTSEC1_X11C17A0000000/, 1 page.
"Wayback Machine PlayBack . . . now with Timestamps!", Internet Archive Blogs, Oct. 5, 2017, 1 page.
"Function of Presenting Elements configuring Web Pages with Timestamps in List added to Wayback Machine, the Internet Archive", Current Awareness Portal by the National Diet Library, Oct. 5, 2017, http://current.ndl.go.jp/node/34792, 2 pages.
Hirofumi Tada, Search Report of Wayback Machine, submitted Oct. 20, 2018 in Case No. H30 YO 22032 of JP Patent No. 5676032, 9 pages.
Ada Lerner et al., Rewriting History: Changing the Archived Web from the Present, published at the 22nd ACM Conference on Computer and Communications Security, printed Oct. 30, 2017, 15 pages.
Supercell's Second Brief, submitted Jun. 1, 2018 in Case No. H30 YO 22032 of JP Patent No. 5676032, 86 pages.
Gree's First Brief, submitted Jun. 26, 2018 in Case No. H30 YO 22032 of JP Patent No. 5676032, 21 pages.
Motion for Preliminary Injunction, submitted Feb. 28, 2018 in Case No. H30 YO 22016 of JP Patent No. 5903517, 24 pages.
Search Result of "Image File, Meta Data, Edit", Google.co.jp, printed Dec. 28, 2017, 2 pages.
"Information Requests, The Internet Archive's Policy for Responding to information Requests", Archive.org, printed Dec. 28, 2017, https://archive.org/legal/, 2 pages.
"Standard Affidavit", Archive.org, printed Dec. 28, 2017, https://archive.org/legal/affidavit.php, 1 page.
"App Statuses", Apple.com, printed Oct. 23, 2017, 3 pages.
Supercell's Second Brief, submitted Jun. 1, 2018 in Case No. H30 YO 22016 of JP Patent No. 5903517, 78 pages.
Gree's First Brief, submitted Jun. 18, 2018 in Case No. H30 YO 22016 of JP Patent No. 5903517, 19 pages.
Motion for Preliminary Injunction, submitted Mar. 2, 2018 in Case No. H30 YO 22019 of JP Patent No. 5911992, 31 pages.
Supercell's Second Brief, submitted May 31, 2018 in Case No. H30 YO 22019 of JP Patent No. 5911992, 77 pages.

(56) References Cited

OTHER PUBLICATIONS

Motion for Preliminary Injunction, submitted Feb. 28, 2018 in Case No. H30 YO 22017 of JP Patent No. 5952946, 23 pages.
Supercell's First Brief, submitted May 15, 2015 in Case No. H30 YO 22017 of JP Patent No. 5952946, 18 pages.
Gree's First Brief, submitted Jul. 6, 2018 in Case No. H30 YO 22017 of JP Patent No. 5952946, 27 pages.
Motion for Preliminary Injunction, submitted Apr. 6, 2018 in Case No. H30 YO 22042 of JP Patent No. 5952947, 31 pages.
Motion for Preliminary Injunction, submitted Feb. 28, 2018 in Case No. H30 YO 22018 of JP Patent No. 5903518, 22 pages.
Supercell's Second Brief, submitted May 31, 2018 in Case No. H30 YO 22018 of JP Patent No. 5903518, 74 pages.
Supercell's Fourth Brief, submitted Jul. 31, 2018 in Case No. H30 YO 22018 of JP Patent No. 5903518, 10 pages.
Nobuhiko Suzuki, A Report on Operation Check of Clash of Clans as of the Filing Date of the Original Application, submitted Jul. 30, 2016, 9 pages.
Naoki Okumura, A Report on Operation Check of Clash at Clans, submitted Jul. 31, 2018, 4 pages.
Naoki Okumura, A Report on Operation Check of Clash of Clans, submitted Jul. 30, 2018, 5 pages.
"Registration Reopened: Clash of Clans Fan Meet Up #1—San Francisco", printed Jul. 19, 2018, https://forum.supercell.com/showthread.php/150023-Registration-Reopens-Clash-of-Clans-Fan-Meet-Up-1-San-Francisco, 2 pages.
"Clash of Clans Meet Up: September 25th!", printed Jul. 19, 2018, https://forum.supercoil.com/showthread.php/149458-Clash-of-Clans-Meet-Up-September-25th%21, 4 pages.
"Clash of Clans: Perfect Translation of Tutorial! Let's get started!", APPBANK.net, Jun. 5, 2013, 19 pages.
"Surging Players! Lecture of How to Play "Clash of Clans"", Famitsu.com, Jun. 4, 2013, https://app.famitsu.com/20130604_173029/, 11 pages.
"Village Edit Mode of Clash of Clans", printed Jul. 5, 2018, http://clashofclans.wikia.com/wiki/Village_Edit_Mode, 4 pages.
Motion for Preliminary Injunction, submitted Feb. 28, 2018 in Case No. H30 YO 22015 of JP Patent No. 5953448, 33 pages.
Supercell's Answer, submitted Mar. 15, 2018 in Case No. H30 YO 22015 of JP Patent No. 5953448, 3 pages.
Kengo Nakajima, Technology for Online Game, Gijutsu-Hyohron Co., Ltd., ISBN976-4-7741-4580-8 C3055, Apr. 25, 2011, 7 pages (p. 79-83, cover page, and back cover page).
Supercell's Fourth Brief, submitted Jun. 19, 2018 in Case No. H30 YO 22015 of JP Patent No. 5953448, 5 pages.
Gree's Second Brief, submitted Jun. 29, 2018 in Case No. H30 YO 22015 of JP Patent No. 5953448, 20 pages.
Supercell's Fifth Brief, submitted Jul. 20, 2018 in Case No. H30 YO 22015 of JP Patent No. 5953448, 45 pages.
Supercell's Petition, submitted Jul. 6. 2018 in Case No. H29 YO 22046 of JP Patent No. 5676032, 5 pages.
Supercell's First Brief, submitted Aug. 22, 2017 in Case No. H29 YO 22046 of JP Patent No. 5676032, 36 pages.
Supercell's Third Brief, submitted Oct. 17, 2017 in Case No. H29 YO 22046 of JP Patent No. 5676032, 59 pages.
Gree's Second Brief, submitted Nov. 8, 2017 in Case No. H29 YO 22046 of JP Patent No. 5676032, 40 pages.
Supercell's Fourth Brief, submitted Nov. 30, 2017 in Case No. H29 YO 22046 of JP Patent No. 5676032, 8 pages.
Grees's Third Brief, submitted Dec. 20, 2017 in Case No. H29 YO 22046 of JP Patent No. 5676032, 12 pages.
Gree's Fourth Brief, submitted Feb. 6, 2018 in Case No. H29 YO 22046 of JP Patent No. 5676032, 11 pages.
Supercell's Fifth Brief, submitted Jan. 26, 2018 in Case No. H29 YO 22046 of JP Patent No. 5676032, 28 pages.
Affidavit of Christopher Butler, submitted Dec. 11, 2017 in Case No. H29 YO 22046 of JP Patent No. 5676032, 21 pages.
Supercell's Answer, submitted Sep. 7, 2017 in Case No. H29 YO 22172 of JP Patent No. 5903518, 35 pages.
Supercell's First Brief, submitted Oct. 11, 2017 in Case No. H29 YO 22172 of JP Patent No. 5903518, 44 pages.
Supercell's Second Brief, submitted Nov. 27, 2017 in Case No. H29 YO 22172 of JP Patent No. 5903518, 18 pages.
"Executive Profile: Lassi Leppinen", Bloomberg.com, printed Oct. 26, 2017, 2 pages.
Supercell's Third Brief, submitted Jan. 9, 2018 in Case No. H29 YO 22172 of JP Patent No. 5903518, 28 pages.
Gree's Seventh Brief, submitted Feb. 16, 2018 in Case No. H29 YO 22172 of JP Patent No. 5903518, 22 pages.
Supercell's First Brief, submitted Aug. 22, 2017 in Case No. H29 YO 22043 of JP Patent No. 5953448, 35 pages.
Supercell's Third Brief, submitted Oct. 17, 2017 in Case No. H29 YO 22043 of JP Patent No. 5953448, 49 pages.
Gree's Second Brief, submitted Nov. 8, 2017 in Case No. H29 YO 22043 of JP Patent No. 5953448, 31 pages.
Supercell's Fourth Brief, submitted Dec. 22, 2017 in Case No. H29 YO 22043 of JP Patent No. 5953448, 22 pages.
Jun Wun Chul, Online Game Programming, Software Publishing Co., ISBN4-7973-2847-9, Mar. 3, 2005, 12 pages (p. iii, p. iv, p. v, p. 1-7, cover page and back cover page).
Yuichiroh Ohtsuki, Online Programming Class with C: Starting from Fourteen, Rutles Inc., ISBN978-4-89977-240-8, Apr. 10, 2009, 15 pages (p. 144-156, cover page and back cover page).
Gree's Third Brief, submitted Jan. 19, 2018 in Case No. H29 YO 22043 of JP Patent No. 5953448, 17 pages.
Supercell's First Brief, submitted Aug. 25, 2017 in Case No. H29 YO 22042 of JP Patent No. 5903517, 28 pages.
Supercell's First Brief, submitted Oct. 13, 2017 in Case No. H29 YO 22042 of JP Patent No. 5903517, 58 pages.
Gree's Second Brief, submitted Nov. 9, 2017 in Case No. H29 YO 22042 of JP Patent No. 5903517, 26 pages.
Supercell's Fourth Brief, submitted Dec. 21, 2017 in Case No. H29 YO 22042 of JP Patent No. 5903517, 26 pages.
Gree's Third Brief, submitted Jan. 22, 2018 in Case No. H29 YO 22042 of JP Patent No. 5903517, 15 pages.
Supercell's Seventh Brief, submitted Feb. 9, 2013 in Cass No. H29 YO 22042 of JP Patent No. 5903517, 15 pages.
Supercell's First Brief, submitted Jul. 27, 2017 in Case No. H29 YO 22041 of JP Patent No. 5911992, 29 pages.
Supercell's Second Brief, submitted Sep. 5, 2017 in Case No. H29 YO 22041 of JP Patent No. 5911992, 54 pages.
Gree's Third Brief, submitted Oct. 10, 2017 in Case No. H29 YO 22041 of JP Patent No. 5911992, 26 pages.
Supercell's Third Brief, submitted Oct. 3, 2017 in Case No. H29 YO 22041 of JP Patent No. 5911992, 14 pages.
"Wikipedia: Soccer", Wikipedia.org, printed Sep. 25, 2017, https://ja.wikipedia.org/wiki%E3%82%B5%E3%83%83%E3%82%AB%E3%83%BC, 14 pages.
Supercell's Fourth Brief, submitted Oct. 10, 2017 in Case No. H29 YO 22041 of JP Patent No. 5911992, 2 pages.
Supercell's Fifth Brief, submitted Nov. 10. 2017 in Case No. H29 YO 22041 of JP Patent No. 5911992, 21 pages.
Gree's Fourth Brief, submitted Nov. 17. 2017 in Case No. H29 YO 22041 of JP Patent No. 5911992, 17 pages.
Supercell's Seventh Brief, submitted Dec. 27, 2017 in Case No. H29 YO 22041 of JP Patent No. 5911992, 17 pages.
Gree's Fifth Brief, submitted Feb. 9, 2018 in Case No. H29 YO 22041 of JP Patent No. 5911992, 19 pages.
Supercell's Answer, submitted Sep. 13, 2017 in Case No. H29 YO 22163 of JP Patent No. 5952946, 33 pages.
Supercell's First Brief, submitted Oct. 20, 2017 in Case No. H29 YO 22163 of JP Patent No. 5952946, 40 pages.
Gree's Second Brief, submitted Nov. 17, 2017 in Case No. H29 YO 22163 of JP Patent No. 5952946, 13 pages.
Supercell's Third Brief, submitted Dec. 26, 2017 in Case No. H29 YO 22163 of JP Patent No. 5952946, 24 pages.
Gree's Second Brief, submitted Feb. 5, 2018 in Case No. H29 YO 22163 of JP Patent No. 5952946, 25 pages.
"Terran—StarCraft II: Wings of Liberty Structures", Gamewise, printed Jan. 19, 2018, 2 pages.

(56) References Cited

OTHER PUBLICATIONS

"Structures—StarCraft II: Wings of Liberty Structures", Gamewise, printed Jan. 19, 2018, https://web.archive.org/web/20130908134452/http://gamewise.co/games/36254/StarCraft-II-Wings-of-Liberty/Structures, 1 page.
Supercell's Answer, submitted Aug. 30, 2017 in Case No. H29 YO 22164 of JP Patent No. 5952947, 38 pages.
Supercell's First Brief, submitted Oct. 17, 2017 in Case No. H29 YO 22164 of JP Patent No. 5952947, 52 pages.
Gree's Second Brief, submitted Nov. 8, 2017 in Case No. H29 YO 22164 of JP Patent No. 5952947, 16 pages.
Supercell's Fourth Brief, submitted Dec. 26, 2017 in Case No. H29 YO 22164 of JP Patent No. 5952947, 21 pages.
Gree's Fourth Brief, submitted Aug. 23, 2018 in Case No. H30 YO 22018 of JP Patent No. 5903518, 6 pages.
Gree's First Brief, submitted Sep. 4, 2018 in Case No. H30 WA 10447 of JP Patent No. 5676032, 11 pages.
Japanese Office Action dated Aug. 21, 2018 in Japanese Patent Application No. 2015-248965 with translation, 6 pages.
"Shin-Temmakai—GOC IV, another side-", Dengeki Play Station, Media Works Corporation, No. 11. vol. 10, p. 198-199, Mar. 11, 2005, section "Point: Make more advantageous Battle Situation, Formation" in p. 199 with partial English translation, 5 pages.
Deposition of David Crane, submitted Sep. 4, 2018 in Case No. PGR2018-00008 of U.S. Pat. No. 9,597,594, 162 pages.
"Exeter Chess Ciub, A place to enjoy and learn about chess". printed Sep. 4, 2018, http://exeterchessclub.org.uk/content/new-starting-formations-tabiat, 9 pages.
"Chess History 1: Shatranj", printed Sep. 4, 2018, https://www.chess.com/clubs/forum/view/chess-history-1-shatranj, 5 pages.
Petitioner's Reply to Patent Owner's Response, submitted Sep. 4, 2018 in Cass No. PGR2018-00008 of U.S. Pat. No. 9,597,594, 32 pages.
Office Action for corresponding European Patent Application No. 14848832.3 dated Oct. 9, 2018 (6 pages).
Japanese Office Action dated Oct. 30, 2018 in Patent Application No. 2018-192989 (with English Translation).
"How to Create StarCraft 2 Custom Map", captured by Wayback Machine, printed Oct. 18, 2018, https://web.archive.org/web/20130307210601/http://segmentnext.com:80/2010/10/14/how-to-create-starcraft-2-custom-map/, 5 pages.
Patent Owner's Sur-Reply submitted Oct. 24, 2018 in Case No. PGR2018-00008 of U.S. Pat. No. 9,597,594.
Final Written Decision entered Jan. 2, 2019 in Case No. PGR2018-00008 of U.S. Pat. No. 9,597,594.
European Examination Report Application No. 14 848 832.3 dated Jan. 17, 2019.
Petitioner's Request for Rehearing and Reconsideration PGR2018-00008 dated Feb. 1, 2019.
Japanese Office Action dated Feb. 5, 2019 in Patent Application No. 2018-192989 (with English Translation).
Armored core and weekly FAMI—a connoisseur, an ENTA, Inc. brain, Feb. 9, 2012, and the 27th volume (with partial English Translation).
Chinese Office Action dated Feb. 2, 2019 in Patent Application No. 201480052507.X (with English Translation).

\* cited by examiner

| FACILITY | TYPE | POSITION | ... |
|---|---|---|---|
| F_001 | S_001 | (3, 2) | ... |
| F_002 | S_001 | (3, 3) | ... |
| F_003 | S_002 | (4, 2) | ... |
| ... | ... | ... | ... |

| TYPE | NAME | IMAGE | ... |
|---|---|---|---|
| S_001 | WALL | S_001.jpg | ... |
| S_002 | HOUSE | S_002.jpg | ... |
| S_003 | CASTLE | S_003.jpg | ... |
| ... | ... | ... | ... |

| TEMPLATE | IMAGE | TYPE | POSITION | ... |
|---|---|---|---|---|
| T_001 | T_001.jpg | S_001 | (1, 1) | ... |
| | | S_001 | (1, 2) | ... |
| | | S_002 | (2, 1) | ... |
| ... | | ... | ... | ... |

| PLAYER | NAME | IMAGE | TEMPLATE | ... |
|---|---|---|---|---|
| P_001 | PLAYER 1 | P_001.jpg | T_001,... | ... |
| P_002 | PLAYER 2 | P_002.jpg | T_003,... | ... |
| P_003 | PLAYER 3 | P_003.jpg | T_004,... | ... |
| ... | ... | ... | ... | ... |

| TEMPLATE | IMAGE | TYPE | POSITION | ... |
|---|---|---|---|---|
| T_001 | T_001.jpg | S_001 | (1, 1) | ... |
|  |  | S_001 | (1, 2) | ... |
|  |  | S_002 | (2, 1) | ... |
| ... | ... | ... | ... | ... |

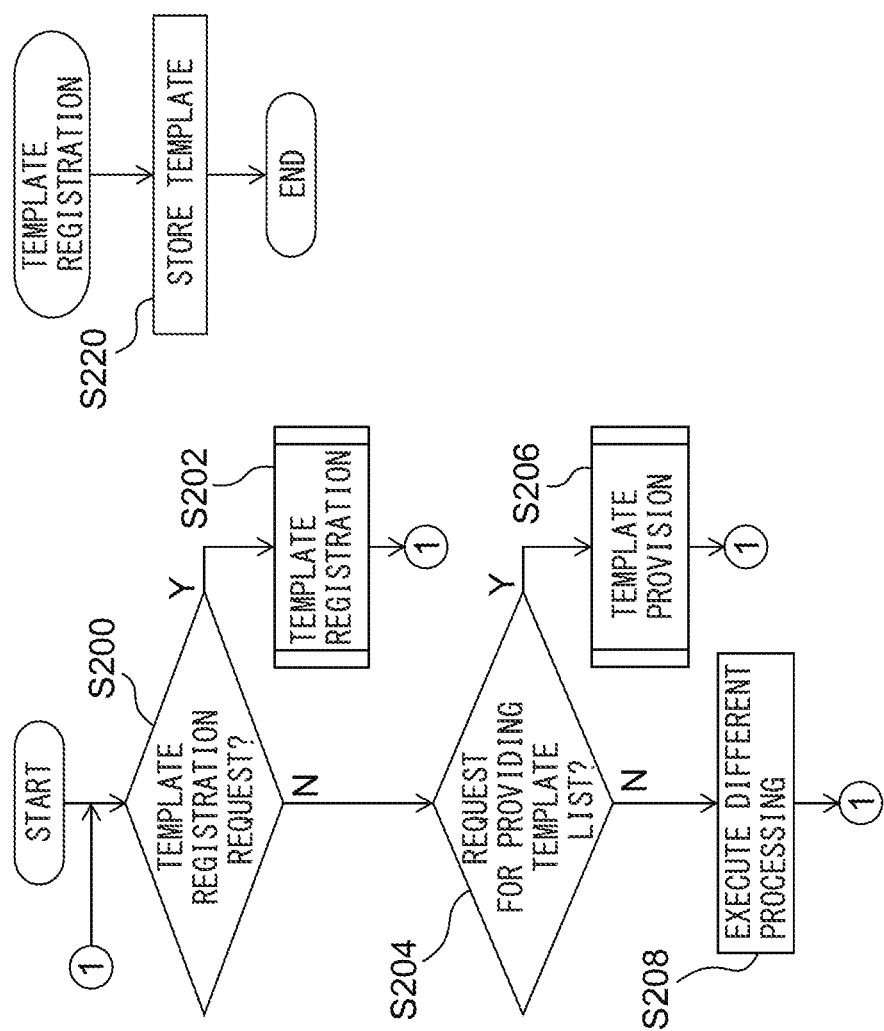

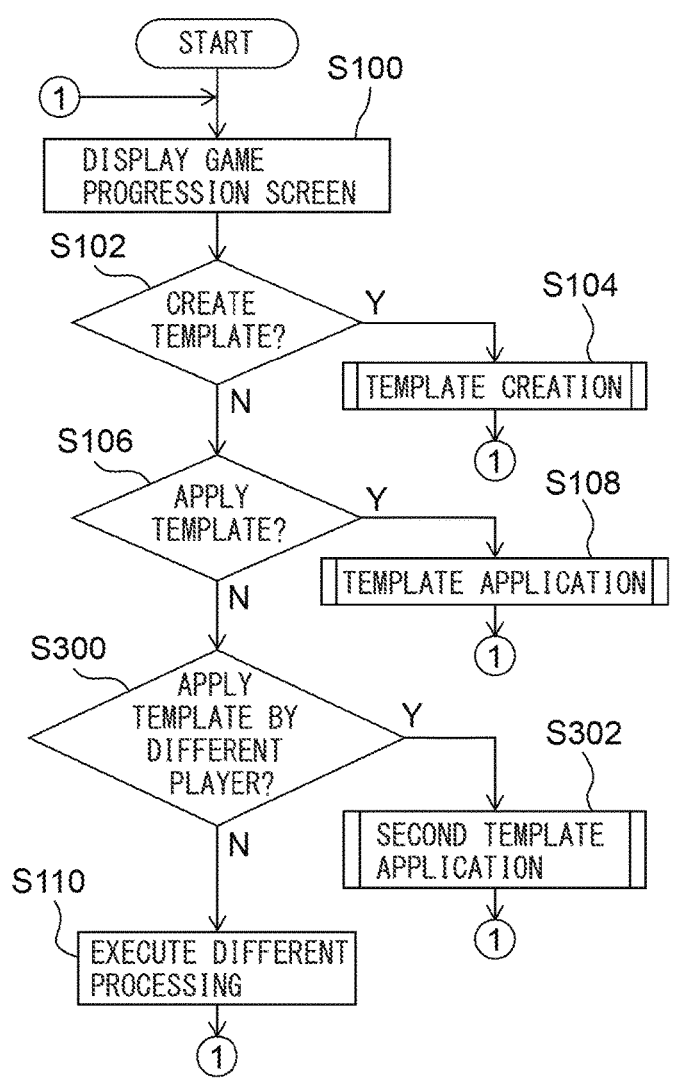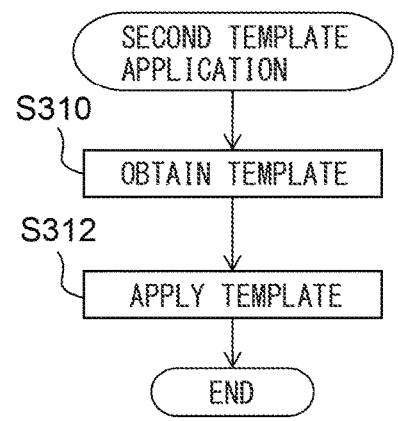
FIG. 10A
FIG. 10B

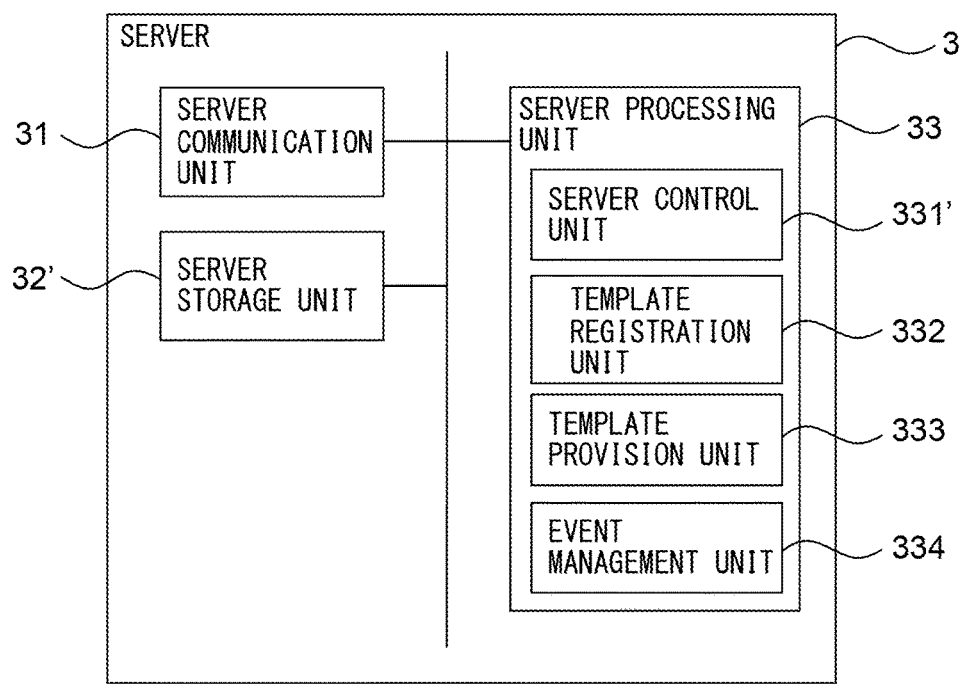

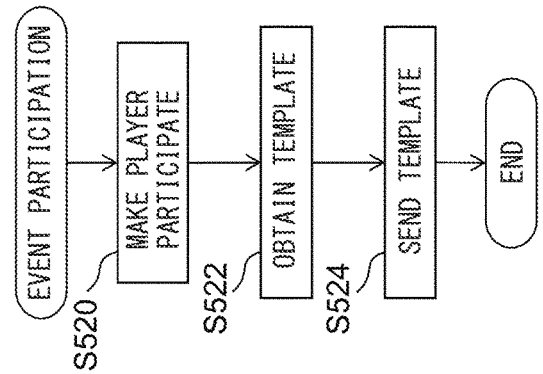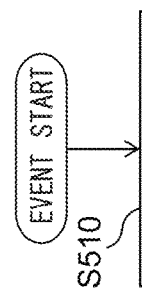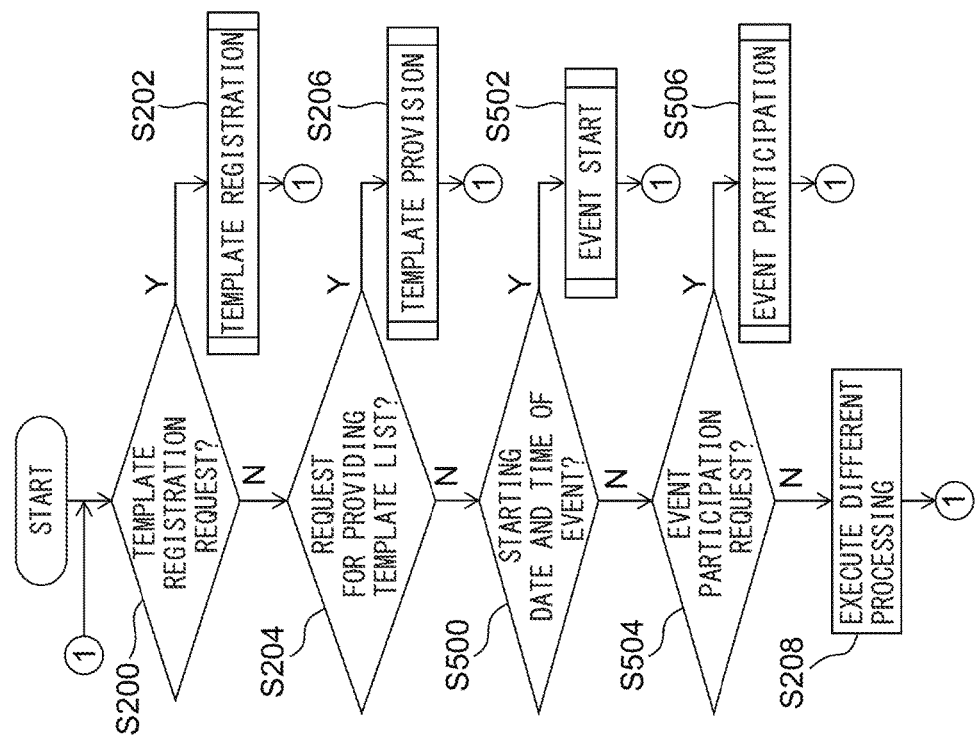

COMPUTER CONTROL METHOD, CONTROL PROGRAM AND COMPUTER

CROSS REFERENCE TO RELATED APPLICATION

The present application is a continuation application which claims the benefit of priority under 35 U.S.C. § 120 of U.S. patent application Ser. No. 15/393,646, filed Dec. 29, 2016, which is a continuation of Ser. No. 14/983,984, filed Dec. 30, 2015, (now U.S. Pat. No. 9,597,594, issued Mar. 21, 2017), which is a continuation of PCT/JP2014/075673, filed Sep. 26, 2014 which claims the benefit of priority from JP 2013-202721, filed on Sep. 27, 2013, JP 2014-080554, filed on Apr. 9, 2014, the entire content of which are incorporated herein by reference.

TECHNICAL FIELD

This invention relates to a method for controlling a computer, a recording medium and a computer.

BACKGROUND

In recent years, games which are played by installing a game program on a portable device from a server via a communication network have become common. Such games include games in which multiple players can participate (so-called "social games"). There are games wherein players can not only fight against or help each other, but are also enabled to communicate with each other.

Such known games include, for example, games (so-called "city building games") wherein a player builds a city within a virtual space (hereinafter referred to as "game space") provided in the game program. In city building games, players can build various facilities (such as houses, streets, ports, train stations, airports, castles, training facilities, etc.) on desired positions and create a city after their liking.

SUMMARY

In conventional city building games, it is the object of the game to build a desired city, and it is unnecessary to completely rebuild a city after it has been built once. On the other hand, in recent city building games, a city built by one player is attacked by a different player, and the city (arrangement of items such as protective walls, buildings that are subject to an attack, protecting soldiers, weapons, etc.) is one of factors for deciding the winning and losing, or superiority and inferiority. However, since the items (game contents) of a city of a player increase as the city develops, it is very complicated for a player to change positions, types, levels, etc., of individual items. Further, it is hard to understand what kind of effect changing a city would have against an attack from a different player. Therefore, many players have limited themselves to change only certain kinds of items, such as soldiers and weapons, for which changing positions, types, levels, etc., is easy. As a result, as the game progresses, it becomes monotonous, and players might become bored with it.

The present invention has been devised to address the above problem, and an object of the invention is to provide a method for controlling a computer, a recording medium and a computer that improve the usability of city building games and continuously attract players to the game.

Provided is a method for controlling a computer that is provided with a storage unit configured to store game contents arranged within a game space, positions of the game contents, and a template defining positions of one or more of game contents, and that progresses a game by arranging the game contents within the game space based on a command by a player. The method includes when the template is applied to a predetermined area within the game space based on the command by the player, moving, by the computer, the game contents arranged within the game space to the positions of the game contents defined by the template.

The computer may be, for example, a portable device, a desktop device, a server, etc., as long as it can execute the above procedure.

In one embodiment, in the above method, the storage unit further stores a template related to a different player, and when the template related to the different player is applied to a predetermined area within the game space based on the command by the player, the computer moves the game contents arranged within the game space to the positions of the game contents defined by the template related to the different player.

In another embodiment, in the above method, the storage unit further stores game contents which are arranged within the game space and are related to the different player, and positions of the game contents, and when the template related to the different player is applied to a predetermined area within the game space based on a command by the different player, the computer moves, out of the game contents arranged within the game space, game contents related to the different player to the positions of the game contents defined by the template related to the different player.

In another embodiment, in the above method, when a start of an event is reported by a different computer, the computer obtains a template for the event from the different computer and moves the game contents arranged within the game space to the positions of the game contents defined by the template obtained from the different computer.

Yet in another embodiment, in the above method, when the number of game contents arranged within the game space is smaller than the number of game contents for which positions are defined by the template, the computer moves the game contents arranged within the game space to the positions of the game contents defined by the template to which the moving distance is the smallest.

Still in another embodiment, in the above method, out of the positions of the game contents defined by the template, the computer displays positions on which no game contents are arranged and the game contents, in a discernible condition.

In another embodiment, in the above method, when the number of game contents arranged within the game space is larger than the number of game contents for which position are defined by the template, the computer moves the game contents arranged within the game space for which the moving distance to the positions of the game contents defined by the template is the smallest, to the positions.

In another embodiment, in the above method, when a template is created for a predetermined area within the game space based on a command from the player, the computer stores positions of game contents arranged within the predetermined area, as the template, in the storage unit.

Yet in another embodiment, in the above method, when a template is created by combining a plurality of templates based on a command from the player or a different player, or commands from the player and the different player, the computer stores the positions of the game contents defined by the plurality of templates, as the template, in the storage unit.

Provided is a non-transitory computer-readable recording medium having recorded thereon a program for a computer that is provided with a storage unit configured to store game contents arranged within a game space, positions of the game contents, and a template defining positions of one or more of game contents, and that progresses a game by arranging the game contents within the game space based on a command by a player. The program causes the computer to execute a process. The process includes when the template is applied to a predetermined area within the game space based on the command by the player, moving, by the computer, the game contents arranged within the game space to the positions of the game contents defined by the template.

Provided is a computer that progresses a game by arranging game contents within a game space based on a command by a player. The computer includes a storage unit configured to store game contents arranged within a game space, positions of the game contents, and a template defining positions of one or more of game contents, and a processing unit configured to apply the template to a predetermined area within the game space based on the command by the player. When the template is applied, the processing unit moves the game contents arranged within the game space to the positions of the game contents defined by the template.

The above method, recording medium and computer make it possible to improve the usability of city building games and continuously attract players to the game by making game contents and the arrangement of the game contents changeable by using templates.

BRIEF DESCRIPTION OF THE DRAWINGS

Other features and advantages of the present invention will be apparent from the ensuing description, taken in conjunction with the accompanying drawings, in which:

FIGS. 7A to 7C illustrate examples of the operational flow of the server;

FIGS. 10A and 10B illustrate examples of the operational flow of the portable device;

FIG. 13A illustrates one possible schematic configuration of the server;

FIG. 13B illustrates an example of a data structure of the event table;

FIGS. 15A to 15C illustrate examples of the operational flow of the server.

DESCRIPTION

Hereinafter, with reference to the drawings, a method for controlling a computer, a recording medium, and a computer will be described. It should be noted that the technical scope of the present invention is not limited to the described embodiments, but covers the invention described in the claims and its equivalent.

First Embodiment

In the present embodiment, a player builds a city within a game space. The player can arrange various facilities which are one example of game contents, within the game space. Further, for a predetermined area within the game space, the player can also create a template stipulating types and positions of facilities based on the types and positions of facilities arranged within the area. Moreover, the player can also apply the created template to a given area within the game space. When a template is applied, facilities arranged within the game space are automatically changed to the facilities defined in the template, and they are automatically moved to the defined positions.

Game contents refer to digital contents used in a game, and include, besides facilities, characters, soldiers, weapons, cards, figures, avatars, items, etc.

Figure 1:
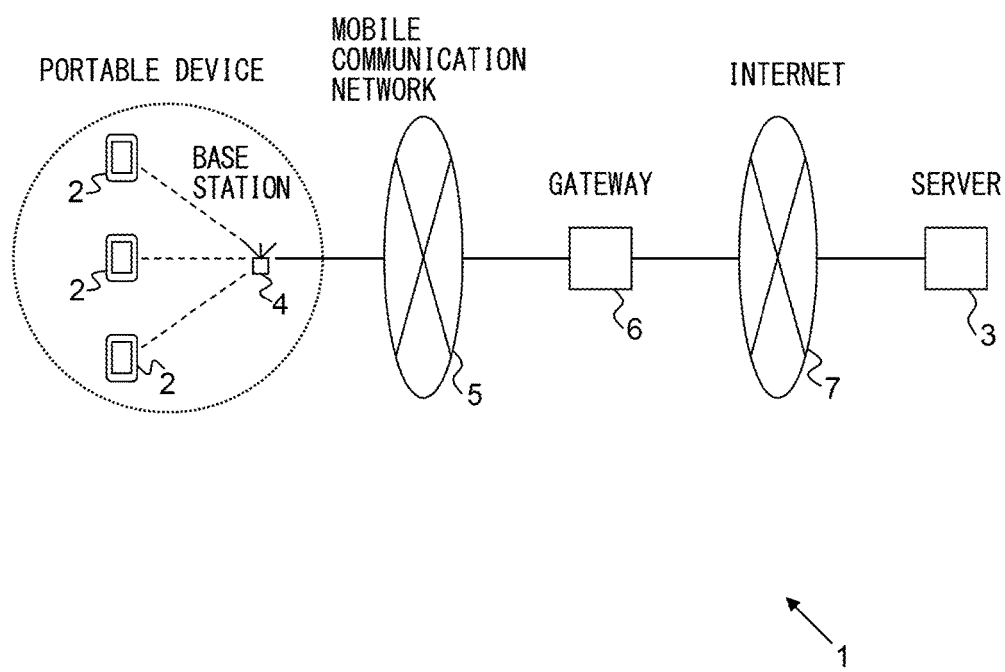
FIG. 1 illustrates an example of a schematic configuration of a game system.

FIG. 1 illustrates an example of a schematic configuration of a game system 1.

The game system 1 includes at least one portable device 2 and a server 3. The portable device 2 and the server 3 are connected to each other via a communication network, and are connected to each other, for example, via a base station 4, a mobile communication network 5, a gateway 6, and the Internet 7. A program to be executed by the portable device 2 (e.g., a game program) and a program to be executed by the server 3 (e.g., a game control program) communicate with each other by using a communication protocol such as a Hypertext Transfer Protocol (HTTP).

Figures 2A, 2B, 2C, 2D:
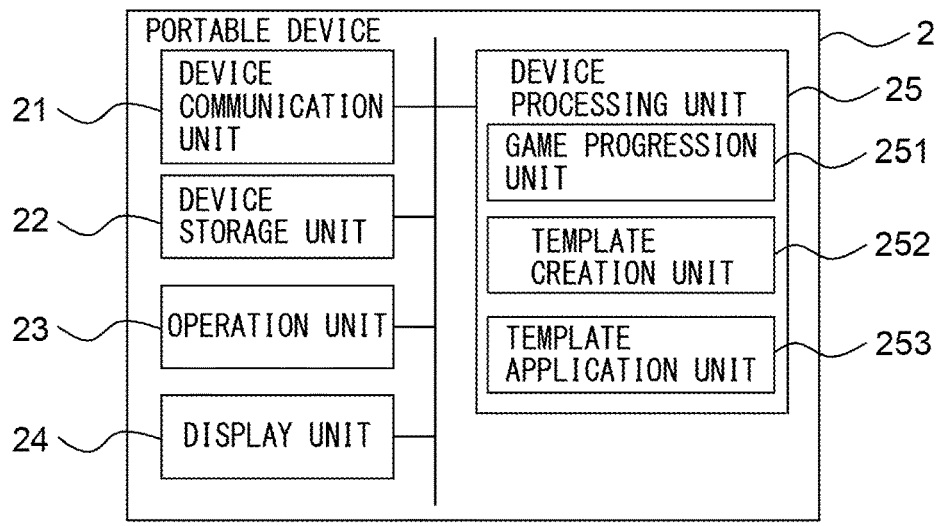
FIG. 2A illustrates an example of a schematic configuration of the portable device.
FIGS. 2B to 2D illustrate examples of data structures of the various types of tables.

FIG. 2A illustrates an example of a schematic configuration of the portable device 2.

The portable device 2 progresses the game in response to an operation of an operation unit 23 by a player. When necessary, the portable device 2 is connected to the server 3 via the base station 4, the mobile communication network 5, the gateway 6, and the Internet 7, to communicate with the server 3. In order to implement the foregoing functions, the portable device 2 includes a device communication unit 21, a device storage unit 22, the operation unit 23, a display unit 24, and a device processing unit 25.

While a multifunctional mobile phone (a so-called "smartphone") may be assumed as the portable device 2, the present invention is not limited to this. The portable device 2 may be, for example, a mobile phone (a so-called "feature phone"), a personal digital assistant (PDA), a portable game machine, a portable music player, a tablet device, a tablet personal computer (PC), a notebook PC, etc., as long as the present invention is applicable thereto.

The device communication unit 21 includes a communication interface circuit including an antenna having a sensitivity band in a predetermined frequency band, and connects the portable device 2 to a wireless communication network. The device communication unit 21 establishes a wireless signal link with the base station 4 by a Code Division Multiple Access (CDMA) system or the like via a channel to be assigned by the base station 4, and communicates with the base station 4. The device communication unit 21 sends data supplied from the device processing unit 25 to the server 3 or the like. The device communication unit 21 supplies the data received from the server 3 or the like to the device processing unit 25.

The device storage unit 22 includes a semiconductor memory, for example. The device storage unit 22 stores an operating system program, a driver program, an application program, data, etc., used for processing in the device processing unit 25. For example, the device storage unit 22 stores an input device driver program for controlling the operation unit 23 and an output device driver program for controlling the display unit 24, as the driver program. The device storage unit 22 stores a game program, etc., for progressing the game and displaying the result thereof, as the application program. The device storage unit 22 stores identification numbers (IDs) of the players, a facility table (FIG. 2B) for managing facilities arranged within the game space, a facility-type table (FIG. 2C) for managing types of the facilities, a template table (FIG. 2D) for managing templates, and image data, video data, etc., relating to the facilities, templates, etc., as the data. Further, the device storage unit 22 may store temporary data relating to predetermined processing.

FIG. 2B depicts a facility table. In the facility table, a facility ID, a type ID, a position within the game space, etc., are recorded for each facility.

In the present embodiment, the game space is configured in grid form, wherein one facility is arranged on one grid, and the position of the facility is represented with the help of grid coordinates that have their origin in a predetermined grid (e.g., upper left of the game space). However, the present invention is not limited to this configuration. Any configuration of the game space, etc., is possible as long as the present invention can be applied to the configuration.

FIG. 2C depicts a facility-type table. In the facility-type table, a type ID, name, file name of image data, etc., are recorded for each type of facility.

FIG. 2D depicts a template table. In the template table, for each template, a template ID, a file name of thumbnail image data, a type ID and a position within the template of each facility, etc., are recorded.

Similarly to FIG. 2B, a position of a facility is represented with the help of the grid coordinates that have their origin in a predetermined grid (e.g., upper left of the template). However, the present invention is not limited to this configuration. Any representation of a position is possible as long as the present invention can be applied with the representation.

The operation unit 23 may be any device capable of operating the portable device 2, for example, a touch panel, a key button or the like. The player can input letters, numbers, symbols, etc., by using the operation unit 23. When operated by the player, the operation unit 23 generates a signal corresponding to the operation. The generated signal is supplied to the device processing unit 25 as a command from the player.

The display unit 24 may be any device capable of displaying a video, an image, etc., for example, a liquid crystal display, an organic electro-luminescence (EL) display, etc. The display unit 24 displays a video, an image, etc., corresponding to video data and image data supplied from the device processing unit 25.

The device processing unit 25 includes one or more processors and their peripheral circuits. The device processing unit 25 is, for example, a central processing unit (CPU), and integrally controls an overall operation of the portable device 2. The device processing unit 25 controls operations of the device communication unit 21, the display unit 24, etc., so that various types of processing of the portable device 2 are executed in an appropriate order in accordance with the programs stored in the device storage unit 22, the operation of the operation unit 23, etc. The device processing unit 25 executes processing based on the programs (the operating system program, the driver program, the application program, etc.) stored in the device storage unit 22. The device processing unit 25 can execute multiple programs (application programs, etc.) in parallel.

FIGS. 3A to 3E illustrate examples of a display screen of the portable device 2.

Figure 3A:
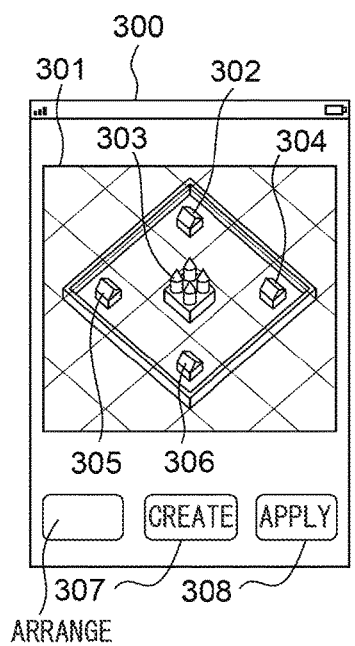
FIGS. 3A to 3E illustrate examples of a display screen of the portable device.

FIG. 3A depicts a game progression screen 300 that is displayed when a command has been given to start the game.

The game progression screen 300 displays a game space 301 and various facilities 302 to 306 arranged within the game space.

Further, multiple buttons are displayed in the lower portion of the game progression screen 300. By pushing buttons, commands are given: pushing a "Create" button 307 creates a template, pushing an "Apply" button 308 applies a template.

Figure 3B:
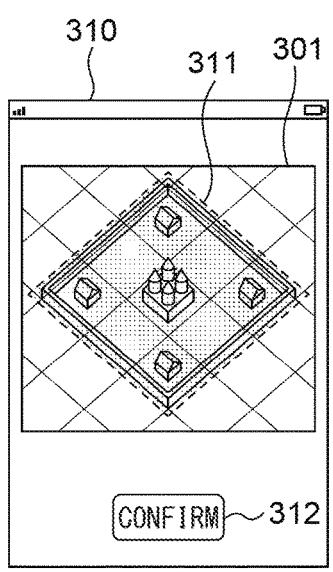

FIG. 3B depicts an area selection screen 310 that is displayed when a command to create a template has been given on the game progression screen 300 depicted in FIG. 3A.

The area selection screen 310 displays the game space 301, in which, for example, by tapping on two arbitrary points, an area 311 with the two points as opposite apexes is selected.

Further, a "Confirm" button 312 is displayed in the lower portion of the area selection screen 310, and by pushing this button, a command is given to create a template for the selected area 311.

Figure 3C:
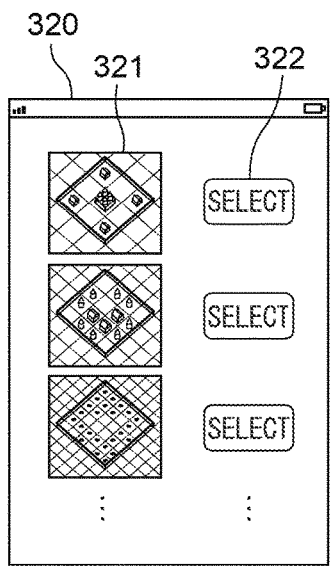

FIG. 3C depicts a template selection screen 320 that is displayed when a command to apply a template has been given on the game progression screen 300 depicted in FIG. 3A.

On the template selection screen 320, a thumbnail image 321 and a "Select" button 322 are displayed for each template. By pushing the "Select" button 322, the corresponding template is selected.

Figure 3D:
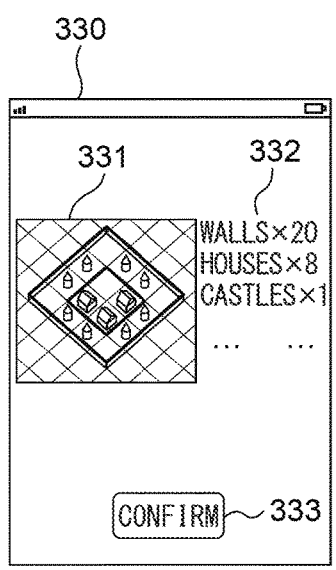

FIG. 3D depicts a template display screen 330 that is displayed when a template has been selected on the template selection screen 320 depicted in FIG. 3C.

A preview image 3310 for when the template is applied to a predetermined area (e.g., around the center) within the game space is displayed in the left portion of the template display screen 330.

Further, names and quantities 3320 of facilities for which positions are defined by the template, are listed in the right portion of the template display screen 330.

Further, a "Confirm" button 333 is displayed in the lower portion of the template display screen 330, and by pushing this button, a template is confirmed.

Figure 3E:
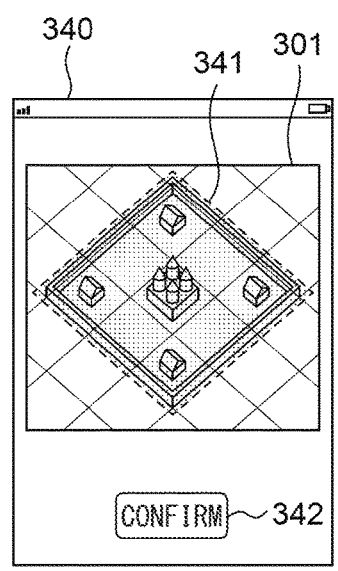

FIG. 3E depicts an area selection screen 340 that is displayed when a template has been confirmed on the template display screen 330 depicted in FIG. 3D.

The area selection screen 340 displays the game space 301, in which, for example, by tapping on two arbitrary points, an area 341 with the two points as opposite apexes is selected.

Further, a "Confirm" button 342 is displayed in the lower portion of the area selection screen 340, and by pushing this button, a command is given to apply the template to the selected area 341.

Figure 4:
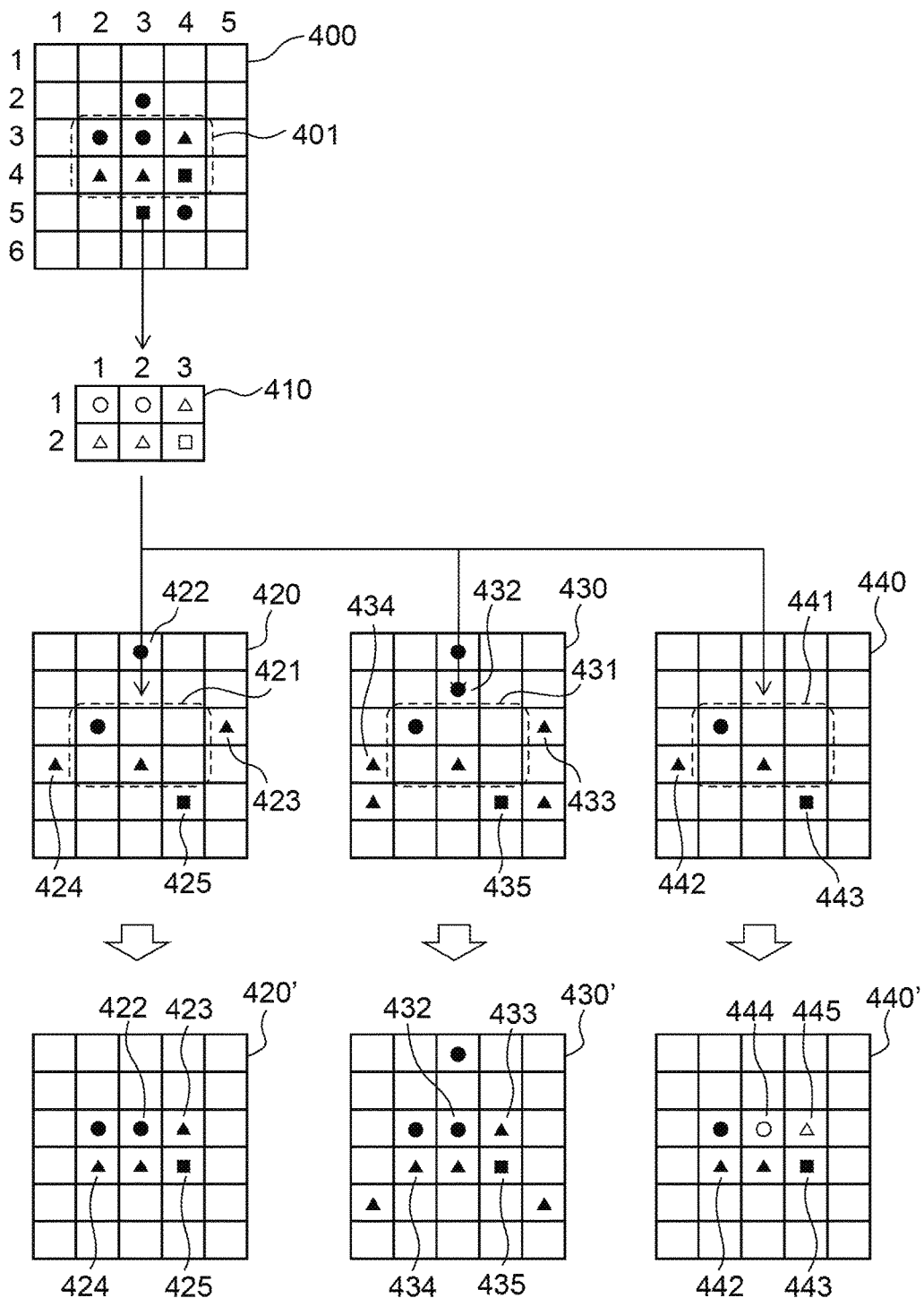
FIG. 4 illustrates a concept of creating and applying a template.

FIG. 4 illustrates a concept of creating and applying a template.

400 illustrates a game space. Nine facilities are arranged within the game space 400. Specifically, four facilities illustrated as "black circle", three facilities illustrated as "black triangle", and two facilities illustrated as "black square" are arranged therein.

Assume that a template has been created for an area 401 within the game space 400. 410 illustrates the created template. The template 410 defines that facilities illustrated as "black circle" of a type illustrated as "white circle" are arranged at (1,1) and (1,2), facilities illustrated as "black triangle" of a type illustrated as "white triangle" are arranged at (1,3), (2,1) and (2,2), and a facility illustrated as "black square" of a type illustrated as "white square" is arranged at (2,3).

420 illustrates another game space. Six facilities are arranged within the game space 420. Specifically, two facilities illustrated as "black circle", three facilities illustrated as "black triangle", and one facility illustrated as "black square" are arranged therein.

Assume that the template 410 has been applied to an area 421 within the game space 420. The number of types of facilities and the number of facilities in each type arranged within the game space 420 are equal to the number of types of facilities and the number of facilities in each type, respectively, positions of the facilities being defined by the template 410. Thus, all facilities arranged within the game space 420 are moved to positions of facilities as defined by the template 410. Actually, facilities 422 to 425 arranged outside of the area 421 are moved to positions of these facilities within the area 421. 420' illustrates the game space 420 after the facilities 422 to 425 have been moved.

430 illustrates yet another game space. Nine facilities are arranged within the game space 430. Specifically, three facilities illustrated as "black circle", five facilities illustrated as "black triangle", and one facility illustrated as "black square" are arranged therein.

Assume that the template 410 has been applied to an area 431 within the game space 430. The number of types of facilities and the number of facilities in each type arranged within the game space 430 is equal to or larger than the number of types of facilities and the number of facilities in each type, respectively, positions of the facilities being defined by the template 410. Thus, of the facilities arranged within the game space 420, those facilities with the smallest moving distance (e.g., Manhattan distance) to positions of facilities defined by the template 410, are moved to the positions of facilities. Actually, facilities 432 to 435 arranged outside of the area 431 are moved to positions of these facilities within the area 431. 430' illustrates the game space 430 after the facilities 432 to 435 have been moved.

The facilities to be moved are not limited to those with the smallest moving distance. The player may also designate facilities which are to be moved, or an area containing facilities which are to be moved. Further, the player may also in advance designate facilities which are not to be moved, or an area containing facilities which are not to be moved.

440 illustrates still another game space. Four facilities are arranged within the game space 440. Specifically, one facility illustrated as "black circle", two facilities illustrated as "black triangle", and one facility illustrated as "black square" are arranged therein.

Assume that the template 410 has been applied to an area 441 within the game space 440. The number of types of facilities and the number of facilities in each type arranged within the game space 440 is equal to or smaller than the number of types of facilities and the number of facilities in each type, respectively, positions of the facilities being defined by the template 410. Thus, all facilities arranged within the game space 440 are moved to positions of facilities defined by the template 410, to which the moving distance is the smallest. Actually, facilities 442 and 443 arranged outside the area 441 are moved to positions of these facilities within the area 441. 440' illustrates the game space 440 after the facilities 442 and 443 have been moved.

In the game space 440', positions on which no facilities are arranged among the positions of facilities defined by the template 410, are illustrated in a condition where the facility type is discernible (e.g., "white circle" 444 and "white triangle" 445).

Further, when no facility has been arranged, it is also possible to present the player with facilities of the same type or with facilities of a similar type as proposals.

Moreover, it is also possible for the player to purchase facilities for positions where no facility has been arranged, or to acquire the facilities, for example, by trading with a different player in a multi-player environment as described below. Moreover, when the player has not arranged a facility defined by a template within the game space but has stored the facility in storage, the player may arrange this facility based on the template, or conversely, the player may store a facility that is not defined by the template, in the storage. Although in the above description, a player creates templates himself/herself, templates may also be distributed from a service-side server 3, or may be acquired from other players. In such cases, a player may not possess a facility defined by a template in some cases. However, whether the player possesses a facility defined by a template may be judged on a portable device 2 side or on a server 3 side, and a screen for purchasing the facility which has been judged not to be in the player's possession may be displayed on the portable device 2, so that the player is automatically guided to a purchase screen.

Further, templates may also be automatically created based on an operation by the player. For example, the server 3 may automatically create templates based on facilities the player possesses, facilities selected by the player, an area and/or an objective of a template. The objective of a template is, for instance, to realize a city that offers strong protection against soldiers with bows and arrows, to realize a city that work effectively for protection against attacks by giants, to strengthen the protection against air attacks, etc. In doing so, it becomes easy for the player to create templates consistent with objectives.

In order to achieve the above-described functions, the device processing unit 25 includes a game progression unit 251, a template creation unit 252, and a template application unit 253. All of these units are functional modules implemented by a program executed on a processor provided in the device processing unit 25. Alternatively, these units may also be provided as firmware on the portable device 2.

In the following, processing by the game progression unit 251 will be described.

The game progression unit 251 controls the start and progression of the game, and appropriately gives commands to execute processing to the template creation unit 252, template application unit 253, etc.

Specifically, when a command to start the game is given by the player via the operation unit 23, the game progression unit 251 displays the game progression screen 300.

In other words, the game progression unit 251 refers to the facility table stored in the device storage unit 22, and extracts a type ID and a position of each facility. Further, the game progression unit 251 refers to the facility-type table stored in the device storage unit 22 by using the extracted type IDs as key, and extracts file names of image data for corresponding types. Further, the game progression unit 251 obtains image data corresponding to the extracted file names, from the device storage unit 22. Then, the game progression unit 251 configures a game progression screen 300 that displays images arising from the obtained image data according to the extracted positions, and that simultaneously displays buttons for receiving commands such as template creation, template application, etc., in a predetermined layout; and outputs the game progression screen 300 to the display unit 24.

When a command to create a template is given by the player via the operation unit 23, the game progression unit 251 gives a command to execute processing to the template creation unit 252.

When a command to apply a template is given by the player via the operation unit 23, the game progression unit 251 gives a command to execute processing to the template application unit 253.

When a command to execute different processing is given by the player via the operation unit 23, the game progression unit 251 executes the different processing.

In the following, processing by the template creation unit 252 will be described.

The template creation unit 252 creates templates, stores the templates in the device storage unit 22, and registers the created templates on the server 3.

Specifically, the template creation unit 252 displays the area selection screen 310.

When an area has been selected and a command to create a template is given by the player via the operation unit 23, the template creation unit 252 creates a template.

In other words, the template creation unit 252 refers to the facility table stored in the device storage unit 22 by using the coordinates of the selected area as key, and extracts a type ID and a position within the game space of each facility arranged within the selected area. The template creation unit 252 further converts the extracted positions within the game space to positions within the template. Moreover, the template creation unit 252 creates thumbnail image data for the selected area, and stores the data in the device storage unit 22. The template creation unit 252 then stores the file name of the stored thumbnail image data, the extracted type ID and position within the template of each facility, etc., in the template table stored in the device storage unit 22 under a newly assigned template ID.

Further, the template creation unit 252 registers the created template on the server 3.

In other words, the template creation unit 252 sends a template registration request via the device communication unit 21 to the server 3 by using the player ID, the assigned template ID, the created thumbnail image data, and the extracted type ID and position within the template of each facility, as parameters.

Then, the template creation unit 252 terminates the processing.

In the following, processing by the template application unit 253 will be described.

The template application unit 253 obtains a template from the device storage unit 22 or the server 3, and applies the obtained template.

Specifically, the template application unit 253 displays the template selection screen 320.

In other words, the template application unit 253 refers to the template table stored in the device storage unit 22, and extracts an ID and a file name of thumbnail image data of each template. Further, the template application unit 253 obtains thumbnail image data corresponding to the extracted file name, from the device storage unit 22.

When necessary, the template application unit 253 sends a request for providing a template list via the device communication unit 21 to the server 3 by using the player ID as a parameter. Further, the template application unit 253 receives an ID and thumbnail image data of each template from the server 3 via the device communication unit 21.

Then, the template application unit 253 configures the template selection screen 320 that displays thumbnail images arising from the obtained thumbnail image data, buttons for receiving commands such as template selection, etc., in a predetermined layout; and outputs the template selection screen 320 to the display unit 24.

When a template is selected by the player via the operation unit 23, the template application unit 253 displays the template display screen 330.

In other words, when the selected template is a template provided by the server 3, the template application unit 253 sends a request for providing the template via the device communication unit 21 to the server 3 by using the ID of the selected template as a parameter. Further, the template application unit 253 receives thumbnail image data of a corresponding template and the type ID and position of each facility from the server 3 via the device communication unit 21. The template application unit 253 then stores the received thumbnail image data in the device storage unit 22. Further, the template application unit 253 stores the ID of the selected template, the file name of the stored thumbnail image data, the received type ID and position of each facility, etc., in the template table stored in the device storage unit 22.

The template application unit 253 refers to the template table stored in the device storage unit 22 by using the ID of the selected template as key, and extracts a type ID of each facility in the corresponding template. The template application unit 253 counts the number of extracted types of facilities. Further, the template application unit 253 refers to the facility-type table stored in the device storage unit 22 by using the extracted type IDs as key, and extracts corresponding names of the types. Moreover, the template application unit 253 creates a preview image for when the selected template is applied to a predetermined area within the game space. Then, the template application unit 253 configures the template display screen 330 that displays the extracted names and the number of facilities, the created preview image, buttons for receiving commands such as template confirmation, etc., in a predetermined layout; and outputs the template display screen 330 to the display unit 24.

In the following, a process of applying a template will be described.

When a template is confirmed by the player via the operation unit 23, the template application unit 253 displays the area selection screen 340.

When an area has been selected and a command to apply a template has been given by the player via the operation unit 23, the template application unit 253 applies the template.

In other words, the template application unit 253 refers to the facility table stored in the device storage unit 22, and extracts an ID, a type ID and a position within the game space of each facility. The template application unit 253 counts the number of extracted types of facilities and the number of facilities in each type. The template application unit 253 further refers to the template table stored in the device storage unit 22 by using the ID of the selected template as key, and extracts a type ID and a position within the template of each facility in the corresponding template. The template application unit 253 counts the number of extracted types of facilities and the number of facilities in each type. Moreover, the template application unit 253 converts the extracted positions within the template to positions within the game space based on coordinates of the selected area. For each type of facility, the template application unit 253 compares the number of facilities of this type within the game space and the number of facilities of this type within the template.

When the former and the latter are equal, the template application unit 253 moves the facilities of this type within the game space to the positions of the facilities of this type within the template. In other words, the template application unit 253 refers to the facility table stored in the device storage unit 22 by using the IDs of the facilities of each type within the game space as key, and stores the positions of the facilities of this type within the template as positions of the corresponding facilities within the game space.

On the other hand, when the former is larger than the latter, the template application unit 253 moves the facilities of this type within the game space for which the moving distance to the positions of the facilities of this type within the template is the smallest, to the positions of these facilities. In other words, for each position of a facility of a type within the template, the template application unit 253 specifies a facility of this type within the game space for which the moving distance to the position is the smallest. The template application unit 253 then refers to the facility table stored in the device storage unit 22 by using the ID of the specified facility as key, and stores the position of the specified facility as position of the corresponding facility within the game space.

On the other hand, when the former is smaller than the latter, the template application unit 253 moves the facilities of a type within the game space to positions of the facilities of this type within the template to which the moving distance is the smallest. In other words, for each facility of a type within the game space, the template application unit 253 specifies a position of a facility of this type within the template to which the moving distance is the smallest. The template application unit 253 then refers to the facility table stored in the device storage unit 22 by using the ID of the facility as key, and stores the specified position as position of the corresponding facility within the game space.

Other than facilities for which the moving distance is the smallest, the player may also designate facilities which are to be moved, or an area containing facilities which are to be moved. Further, the player may also in advance designate facilities which are not to be moved, or an area containing facilities which are not to be moved.

Then, the template application unit 253 terminates the processing.

Figures 5A, 5B, 5C:
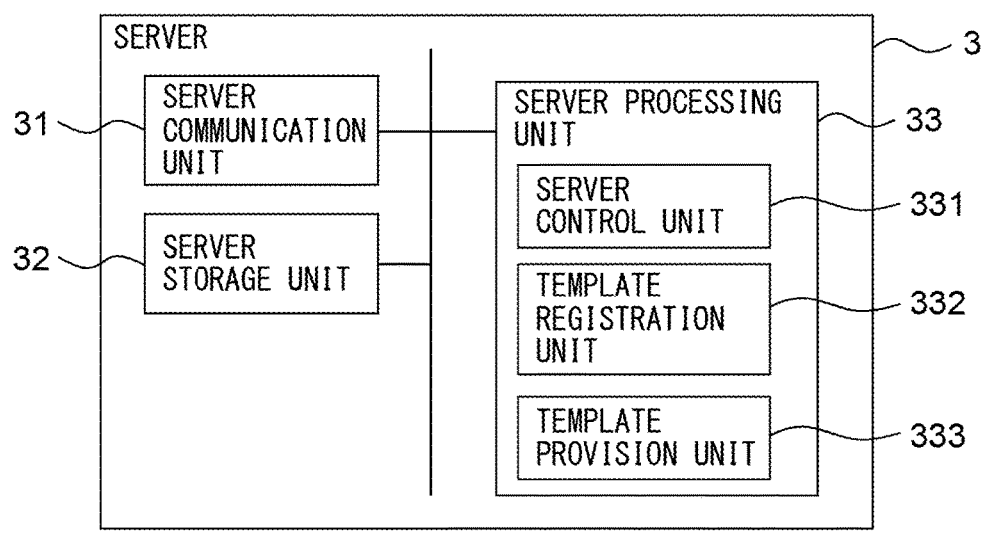
FIG. 5A illustrates one possible schematic configuration of the server.
FIGS. 5B and 5C illustrate examples of data structures of the various types of tables.

FIG. 5A illustrates one possible schematic configuration of the server 3.

In response to requests from the portable device 2, the server 3 registers and provides templates. In order to achieve such functions, the server 3 is provided with a server communication unit 31, a server storage unit 32, and a server processing unit 33.

The server communication unit 31 includes a communication interface circuit for connecting the server 3 to the Internet 7, and communicates with the Internet 7. The server communication unit 31 supplies the data received from the portable device 2 or the like to the server processing unit 33. The server communication unit 31 sends the data supplied from the server processing unit 33 to the portable device 2 or the like.

The server storage unit 32 includes at least one of a magnetic tape device, a magnetic disk device and an optical disk device, for example. The server storage unit 32 stores an operating system program, a driver program, an application program, data, etc., used for processing in the server processing unit 33. The server storage unit 32 stores, for example, a game control program, etc., for registering and providing templates, as the application program. The server storage unit 32 stores a player table (FIG. 5B) for managing players, a template table (FIG. 5C) for managing templates, and image data, video data, etc., relating to the players, templates, etc., as the data. Further, the server storage unit 32 may store temporary data relating to certain processing.

FIG. 5B depicts a player table. In the player table, a player ID, a name, a file name of image data, an ID of a created template, etc., are recorded for each player.

FIG. 5C depicts a template table. Similarly to FIG. 2D, in the template table, for each template, a template ID, a file name of thumbnail image data, a type ID and a position within the template of each facility, etc., are recorded.

The server processing unit 33 includes one or more processors and their peripheral circuits. The server processing unit 33 is, for example, a CPU, and integrally controls an overall operation of the server 3. The server processing unit 33 controls an operation of the server communication unit 31 or the like so that various types of processing of the server 3 are executed in an appropriate order in accordance with the programs stored in the server storage unit 32. The server processing unit 33 executes processing based on the programs stored in the server storage unit 32 (the operating system program, the driver program, the application program, etc.). The server processing unit 33 can execute the multiple programs (the application program, etc.) in parallel.

The server processing unit 33 includes a server control unit 331, a template registration unit 332, and a template provision unit 333. Each of the units is a functional module implemented by a program to be executed by the processor included in the server processing unit 33. Alternatively, each of the units may be provided as a firmware on the server 3.

In the following, processing by the server control unit 331 will be described.

The server control unit 331 controls the performance of the server and appropriately gives commands to execute processing to the template registration unit 332, template provision unit 333, etc.

Specifically, when a template registration request is received from the portable device 2 via the server communication unit 31, the server control unit 331 gives the template registration unit 332 a command to execute processing, by using the received template registration request as a parameter.

When a request for providing a template list or a template provision request is received from the portable device 2 via the server communication unit 31, the server control unit 331 gives the template provision unit 333 a command to execute processing, by using the received request for providing a template list or the like as a parameter.

When a different request is received from the portable device 2 via the server communication unit 31, the server control unit 331 executes different processing corresponding to the request.

In the following, processing by the template registration unit 332 will be described.

The template registration unit 332 stores templates in the server storage unit 32.

In other words, the template registration unit 332 interprets the received template registration request, and specifies the ID of the player, the ID of the template, thumbnail image data, as well as the type ID and position of each facility. Then, the template registration unit 332 stores the specified thumbnail image data in the server storage unit 32. The template registration unit 332 further refers to the player table stored in the server storage unit 32 by using the specified player ID as key, and stores the specified template ID as an ID of a template created by the corresponding player. Moreover, the template registration unit 332 stores the specified template ID, the file name of the stored thumbnail image data, the type ID and position of each specified facility, etc., in the template table stored in the server storage unit 32.

Then, the template registration unit 332 terminates the processing.

In the following, processing by the template provision unit 333 will be described.

The template provision unit 333 obtains a template list or a template from the server storage unit 32, and sends the obtained template list or the like to the portable device 2.

Specifically, when a request for providing a template list has been received, the template provision unit 333 obtains a template list from the server storage unit 32.

In other words, the template provision unit 333 interprets the received request for providing a template list, and specifies the ID of the player. The template provision unit 333 then refers to the player table stored in the server storage unit 32 by using the specified player ID as key, and extracts an ID of a template created by a player different from the corresponding player. Further, the template provision unit 333 refers to the template table stored in the server storage unit 32 by using the extracted template ID as key, and extracts a file name of thumbnail image data for the corresponding template. Moreover, the template provision unit 333 obtains the thumbnail image data corresponding to the extracted file name, from the server storage unit 32.

On the other hand, when a template provision request is received, the template provision unit 333 obtains a template from the server storage unit 32.

In other words, the template provision unit 333 interprets the received template provision request, and specifies the ID of the template. Then, the template provision unit 333 refers to the template table stored in the server storage unit 32 by using the specified template ID as key, and extracts a file name of thumbnail image data for the corresponding template, as well as the type ID and position of each facility.

Further, the template provision unit 333 obtains thumbnail image data corresponding to the extracted file name, from the server storage unit 32.

The template provision unit 333 sends the obtained template list or the like to the portable device 2.

In other words, the template provision unit 333 sends the extracted ID of each template and the thumbnail image data, or the thumbnail image data of the template as well as the type ID and position of each facility that are obtained or the like, to the portable device 2 via the server communication unit 31.

Then, the template provision unit 333 terminates the processing.

Figure 6C:
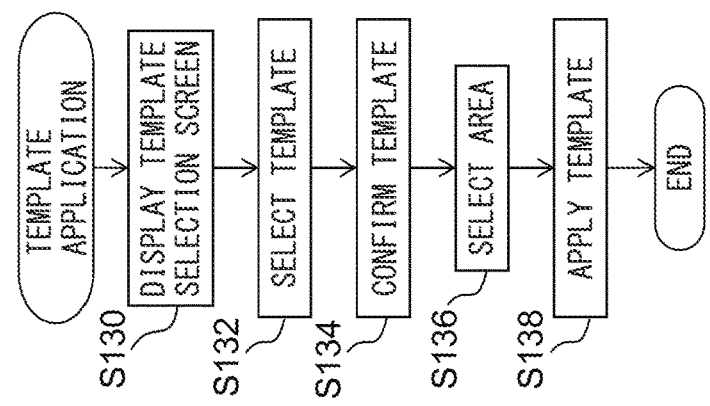
FIGS. 6A to 6C illustrate examples of the operational flow of the portable device.
Figure 6B:
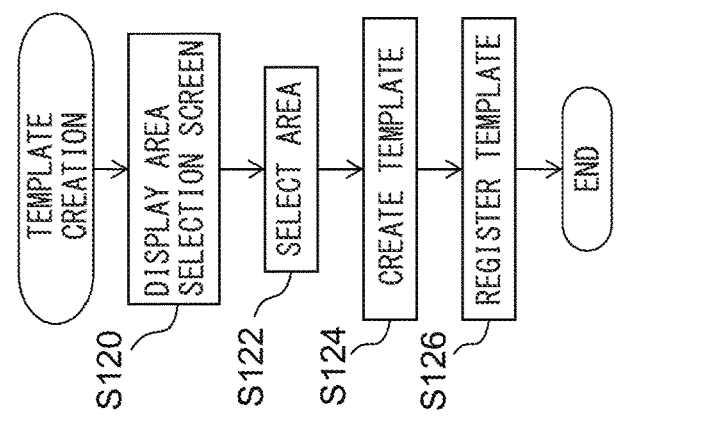
Figure 6A:
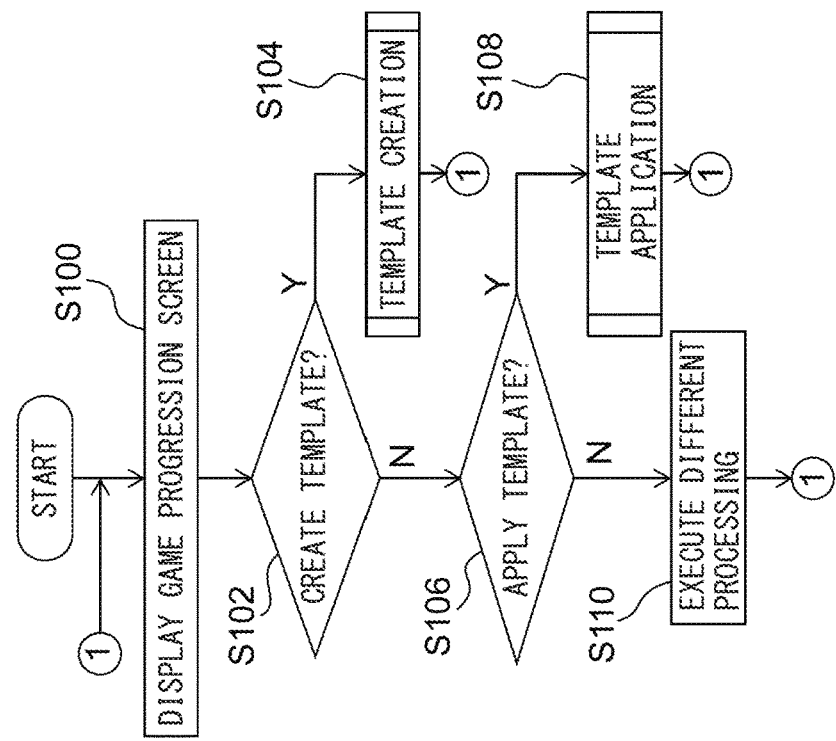

FIGS. 6A to 6C illustrate examples of the operational flow of the portable device 2.

The below-described operational flow is executed, based on a program that is stored in advance in the device storage unit 22, mostly by the device processing unit 25 by working together with each component of the portable device 2.

FIG. 6A illustrates an example of the operational flow of the game progression unit 251.

The player gives the device processing unit 25 a command to start a game via the operation unit 23. The device processing unit 25 starts processing based on the game program. In other words, the game progression unit 251 implemented by the game program displays the game progression screen 300 (Step S100).

When a command to create a template is given by the player via the operation unit 23 (Step S102—Yes), the game progression unit 251 gives the template creation unit 252 a command to execute processing (Step S104).

FIG. 6B illustrates an example of the operational flow of the template creation unit 252.

The template creation unit 252 displays the area selection screen 310 (Step S120).

When an area is selected by the player via the operation unit 23 (Step S122) and a command to create a template is given, the template creation unit 252 creates a template (Step S124).

The template creation unit 252 registers the created template on the server 3 (Step S126). Then, the template creation unit 252 terminates processing.

On the other hand, when a command to apply a template is given by the player via the operation unit 23 (Step S106—Yes), the game progression unit 251 gives the template application unit 253 a command to execute processing (Step S108).

FIG. 6C illustrates an example of the operational flow of the template application unit 253.

The template application unit 253 displays the template selection screen 320 (Step S130).

When a template is selected by the player via the operation unit 23 (Step S132), the template application unit 253 displays the template display screen 330.

When the template is confirmed by the player via the operation unit 23 (Step S134), the template application unit 253 displays the area selection screen 340.

When an area is selected by the player via the operation unit 23 (Step S136) and a command to apply a template is given, the template application unit 253 applies the template (Step S138). Then, the template application unit 253 terminates processing.

On the other hand, when a command for different processing is given by the player via the operation unit 23 (Step S106—No), the game progression unit 251 executes the different processing (Step S110).

FIGS. 7A to 7C illustrate examples of the operational flow of the server 3.

The below-described operational flow is executed, based on a program that is stored in advance in the server storage unit 32, mostly by the server processing unit 33 by working together with each component of the server 3.

FIG. 7A illustrates an example of the operational flow of the server control unit 331.

When a template registration request is received from the portable device 2 via the server communication unit 31 (Step S200—Yes), the server control unit 331 gives the template registration unit 332 a command to execute processing (Step S202), by using the received template registration request as a parameter.

FIG. 7B illustrates an example of the operational flow of the template registration unit 332.

The template registration unit 332 stores the template included in the received template registration request in the server storage unit 32 (Step S220). Then, the template registration unit 332 terminates processing.

On the other hand, when a request for providing a template list or a template provision request is received from the portable device 2 via the server communication unit 31 (Step S204—Yes), the server control unit 331 gives the template provision unit 333 a command to execute processing (Step S206), by using the received request for providing a template list or the like as a parameter.

FIG. 7C illustrates an example of the operational flow of the template provision unit 333.

When the request for providing a template list is received (Step S230—Yes), the template provision unit 333 obtains a list of templates of players other than the player corresponding to the player ID included in the received request for providing a template list, from the server storage unit 32 (Step S232).

On the other hand, when the template provision request is received (Step S230—No), the template provision unit 333 obtains a template corresponding to the template ID included in the received template provision request, from the server storage unit 32 (Step S234).

The template provision unit 333 sends the obtained template list or the like to the portable device 2 (Step S236). Then, the template provision unit 333 terminates processing.

On the other hand, when a different request is received from the portable device 2 via the server communication unit 31 (Step S204—No), the server control unit 331 executes different processing corresponding to the request (Step S208).

As have been described above, by making the arrangement of facilities changeable by using templates, the usability of city building games is improved, and it becomes possible to continuously attract players to the game.

In the above-described embodiment, the case is described where upon application of a template, facilities are automatically arranged within the game space based on definition in the template. However, it is also possible that when a template is being applied, a mark is displayed on the game space, so that the player can use this mark as approximation and change the types and positions of facilities himself/herself.

Further, besides buildings, walls, fences and so forth, facilities may also include information on types and quantities of soldiers and weapons to fight back against an attack by a different player.

Further, multiple templates may be prepared corresponding to objectives, and the player may be able to select a template depending on the objective. To give specific examples; there are multiple types of soldiers with which a different player attacks, and there may be a template realizing a city that offers strong protection against soldiers with bows and arrows, a template realizing a city that work effectively for protection against attacks by giants, a template that strengthens the protection against air attacks, etc.

Moreover, a characteristic value of each template may be calculated based on the facilities included in the template and the records of battles fought using the template in the game. Further, the characteristic value of the template and characteristics of the template based on the characteristic value may be displayed and presented to the player. Specifically, a defense power may be displayed based on parameters of protective facilities and the number of the protective facilities included in the template; a winning percentage when using the template may be displayed; and characteristic that the template has good defense power and a good winning percentage is displayed based on the defense power and winning percentage included in the templates. Thus, the player can easily understand the characteristics of respective templates and compare the characteristics.

Second Embodiment

In the first embodiment, a single player environment is assumed, wherein a player progresses the game by himself/herself. However, the present invention can also be applied to a multi-player environment wherein multiple players progress the game together. In the present embodiment, multiple players build a city within a single game space, and each player applies templates to a predetermined area within the game space. When a template is applied by a player, the facilities that belong to the player among the facilities arranged within the game space are moved to positions of these facilities defined by the template.

Since the schematic configuration of the game system 1 is the same as illustrated in FIG. 1, a description thereof is omitted.

Figures 8A, 8B:
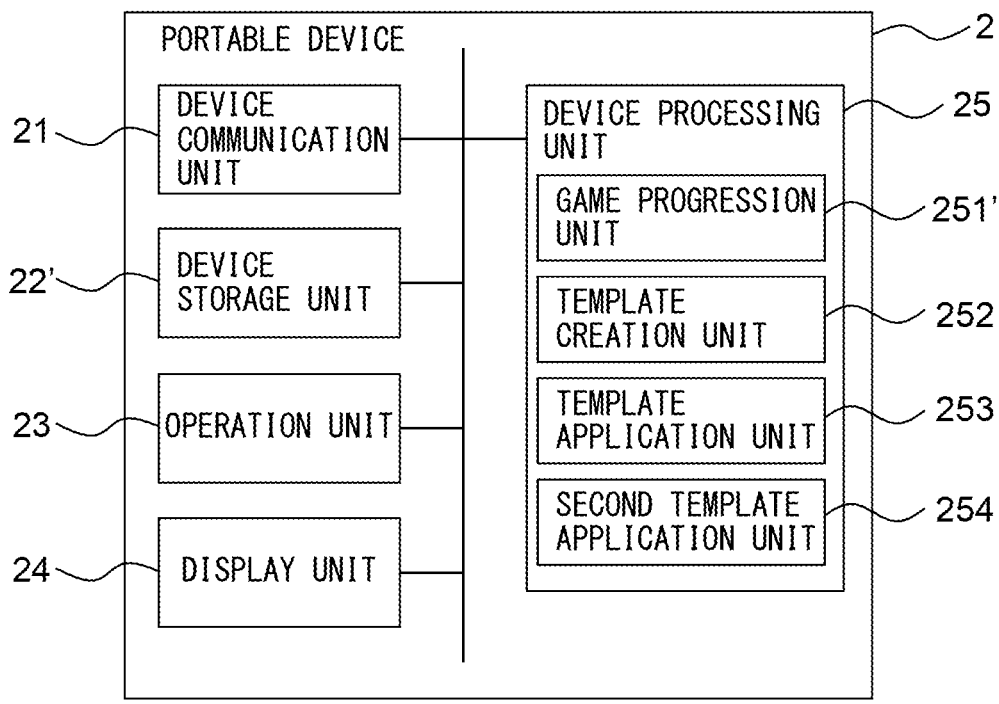
FIG. 8A illustrates an example of a schematic configuration of the portable device according to the second embodiment.
FIG. 8B illustrates an example of a data structure of the facility table.

FIG. 8A illustrates an example of a schematic configuration of the portable device 2.

The portable device 2 progresses the game in response to an operation of an operation unit 23 by a player or a command from a different portable device 2. When necessary, the portable device 2 is connected to the server 3 via the base station 4, the mobile communication network 5, the gateway 6, and the Internet 7, to communicate with the server 3. In order to implement the foregoing functions, the portable device 2 includes a device communication unit 21, a device storage unit 22', the operation unit 23, a display unit 24, and a device processing unit 25.

Since the device communication unit 21, the operation unit 23, and the display unit 24 are the same as illustrated in FIG. 2A, a description thereof is omitted.

The device storage unit 22' includes a semiconductor memory, for example. The device storage unit 22' stores an operating system program, a driver program, an application program, data, etc., used for processing in the device processing unit 25. For example, the device storage unit 22' stores an input device driver program for controlling the operation unit 23 and an output device driver program for controlling the display unit 24, as the driver program. The device storage unit 22' stores a game program, etc., for progressing the game and displaying the result thereof, as the application program. The device storage unit 22' stores player IDs, a facility table (FIG. 8B) for managing facilities arranged within the game space, a facility-type table (FIG. 2C) for managing types of the facilities, a template table (FIG. 2D) for managing templates, and image data, video data, etc., relating to the facilities, templates, etc., as the data. Further, the device storage unit 22' may store temporary data relating to predetermined processing.

FIG. 8B depicts a facility table. In the facility table, for each player, an ID of each facility arranged within the game space by the player, a type ID, a position within the game space, etc., are recorded.

The device processing unit 25 includes one or more processors and their peripheral circuits. The device processing unit 25 is, for example, a CPU, and integrally controls an overall operation of the portable device 2. The device processing unit 25 controls operations of the device communication unit 21, the display unit 24, etc., so that various types of processing of the portable device 2 are executed in an appropriate order in accordance with the programs stored in the device storage unit 22', the operation of the operation unit 23, etc. The device processing unit 25 executes processing based on the programs (the operating system program, the driver program, the application program, etc.) stored in the device storage unit 22'. The device processing unit 25 can execute multiple programs (application programs, etc.) in parallel.

Figure 9:
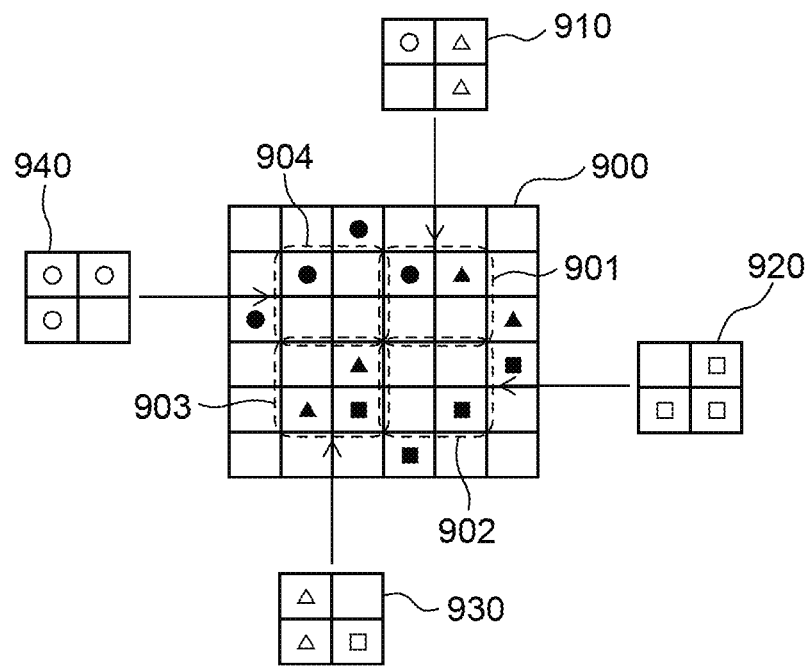
FIG. 9 illustrates a concept of applying a template in a multi-player environment.

FIG. 9 illustrates a concept of applying a template in a multi-player environment.

900 illustrates a game space. Twelve facilities are arranged within the game space 900. Specifically, four facilities illustrated as "black circle", four facilities illustrated as "black triangle", and four facilities illustrated as "black square" are arranged therein. Among these facilities, assume that the one facility illustrated as "black circle" and the two facilities illustrated as "black triangle" arranged in the upper-right three by three squares are those of a $player_1$. Further, assume that the three facilities illustrated as "black square" arranged in the lower-right three by three squares are those of a $player_2$, the two facilities illustrated as "black triangle" and the one facility illustrated as "black square" arranged in the lower-left three by three squares are those of a $player_3$, and the three facilities illustrated as "black circle" arranged in the upper-left three by three squares are those of a $player_4$.

Assume that a template 910 has been applied to an area 901 within the game space 900 by the $player_1$. Similarly, assume that templates 920 to 940 have been applied to areas 902 to 904 by the $player_2$ to $player_4$, respectively. In relation to the $player_1$, the number of types of facilities and the number of facilities in each type arranged within the game space 900 are equal to the number of types of facilities and the number of facilities in each type, respectively, positions of the facilities being defined by the template 910. Thus, all facilities of the $player_1$ are moved to positions of facilities as defined by the template 910. Similarly, all facilities of the $player_2$ to $player_4$ are moved to positions of facilities as defined by the templates 920 to 940, respectively. 900' illustrates the game space 900 after all the facilities have been moved.

In order to achieve the above-described functions, the device processing unit 25 includes a game progression unit 251', a template creation unit 252, a template application unit 253, and a second template application unit 254. All of these units are functional modules implemented by a program executed on a processor provided in the device processing unit 25. Alternatively, these units may also be provided as firmware on the portable device 2.

Since the template creation unit 252 and the template application unit 253 are the same as illustrated in FIG. 2A, a description thereof is omitted.

In the following, processing by the game progression unit 251' will be described.

The game progression unit 251' controls the start and progression of the game, and appropriately gives commands to execute processing to the template creation unit 252, template application unit 253, second template application unit 254, etc.

Specifically, when a command to start the game is given by the player via the operation unit 23, the game progression unit 251' displays the game progression screen 300.

When a command to create a template is given by the player via the operation unit 23, the game progression unit 251' gives a command to execute processing to the template creation unit 252.

When a command to apply a template is given by the player via the operation unit 23, the game progression unit 251' gives a command to execute processing to the template application unit 253.

When a template application command is received from a different portable device 2 via the device communication unit 21, the game progression unit 251' gives the second template application unit 254 a command to execute processing, by using the received template application command as a parameter.

When a command to execute different processing is given by the player via the operation unit 23, the game progression unit 251' executes the different processing.

In the following, processing by the second template application unit 254 will be described.

The second template application unit 254 obtains a template from the server 3, and applies the obtained template.

Specifically, the second template application unit 254 obtains a template from the server 3.

In other words, the second template application unit 254 interprets the received template application command, and specifies the ID of the player, the ID of the template, and the coordinates of the area to which the template is to be applied. Further, the second template application unit 254 sends a template provision request via the device communication unit 21 to the server 3 by using the specified template ID as a parameter. Further, the second template application unit 254 receives thumbnail image data of a corresponding template, as well as the type ID and position of each facility from the server 3 via the device communication unit 21. The second template application unit 254 then stores the received thumbnail image data in the device storage unit 22'. Further, the second template application unit 254 stores the ID of the specified template, the file name of the stored thumbnail image data, the received type ID and position of each facility, etc., in the template table stored in the device storage unit 22'.

The second template application unit 254 applies the obtained template.

In other words, the second template application unit 254 refers to the facility table stored in the device storage unit 22' by using the ID of the specified player as key, and extracts an ID, a type ID and a position within the game space of each facility of the corresponding player. The second template application unit 254 counts the number of extracted types of facilities and the number of facilities in each type. The second template application unit 254 further refers to the template table stored in the device storage unit 22' by using the ID of the specified template as key, and extracts a type ID and a position within the template of each facility in the corresponding template. The second template application unit 254 counts the number of extracted types of facilities and the number of facilities in each type. Moreover, the second template application unit 254 converts the extracted positions within the template to positions within the game space based on coordinates of the specified area. For each type of facility, the second template application unit 254 compares the number of facilities of this type within the game space and the number of facilities of this type within the template, and, according to the result, moves the facilities of this type within the game space to the positions of the facilities of this type within the template.

Then, the second template application unit 254 terminates the processing.

Since the schematic configuration of the server 3 is the same as illustrated in FIG. 5A, a description thereof is omitted.

FIGS. 10A and 10B illustrate examples of the operational flow of the portable device 2.

The below-described operational flow is executed, based on a program that is stored in advance in the device storage unit 22', mostly by the device processing unit 25 by working together with each component of the portable device 2.

FIG. 10A illustrates an example of the operational flow of the game progression unit 251'.

Since Steps S100 to S108 are the same as illustrated in FIG. 6A, a description thereof is omitted.

When a template application command is received from a different portable device 2 via the device communication unit 21 (Step S300—Yes), the game progression unit 251' gives the second template application unit 254 a command to execute processing, by using the received template application command as a parameter (Step S302).

FIG. 10B illustrates an example of the operational flow of the second template application unit 254.

The second template application unit 254 obtains a template corresponding to the template ID included in the received template application command, from the server 3 (Step S310).

The second template application unit 254 applies the obtained template (Step S312). Then, the second template application unit 254 terminates the processing.

On the other hand, when a command for different processing is given by the player via the operation unit 23 (Step S300—No), the game progression unit 251' executes the different processing (Step S110).

As have been described above, by allowing each player to change the arrangement of facilities by using templates in a multi-player environment, the usability of city building games is improved, and it becomes possible to continuously attract players to the game.

It should be noted that the present invention is not limited to the above-described embodiment. For example, in the above-described embodiment, in order to combine multiple templates to create a single template, it is assumed that a player applies multiple templates to predetermined areas within the game space, or multiple players apply a template each to predetermined areas within the game space, and then a template for a predetermined area that encompasses all these areas is created. However, a player may designate multiple templates or multiple players may designate a template each, and then a template may be created by directly joining these templates.

Figure 11:
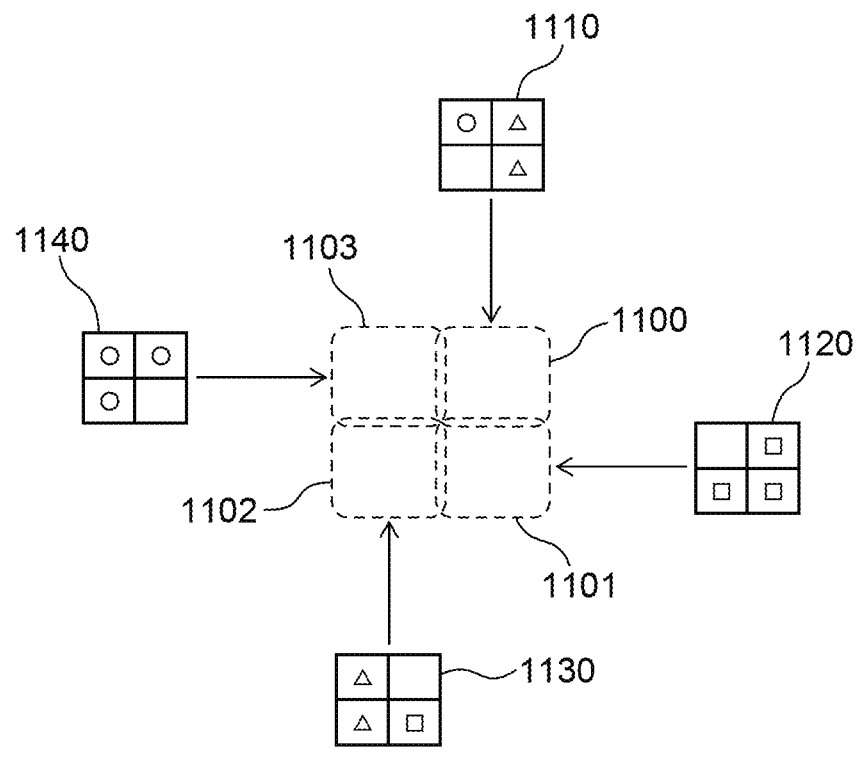
FIG. 11 illustrates a concept of combining templates in a multi-player environment.

FIG. 11 illustrates a concept of combining templates in a multi-player environment.

Assume that the player$_1$ has specified a template 1110 for an area 1100. Further, assume that the player$_2$ to player$_4$ have specified templates 1120 to 1140 for areas 1101 to 1103, respectively. 1150 illustrates a template obtained by combining the templates 1110 to 1140.

In order to achieve the above-described functions, the portable device 2 may perform processing as described below.

When a command to create a template is given by the player via the operation unit 23, the portable device 2 displays a predetermined screen and receives designations of template and area. In the same manner, the portable device 2 receives designations of template and area from a different portable device 2. Then, the portable device 2 obtains the designated templates from the device storage unit 22 or the server 3, and creates a new template by arranging the obtained templates on the designated areas.

In other words, the portable device 2 corrects the position of each facility defined by the obtained templates based on the coordinates specified by the designated areas. The portable device 2 then stores the type ID and corrected position, etc., of each facility defined by the obtained templates, in the template table stored in the device storage unit 22 under a newly assigned template ID.

Third Embodiment

In the above-described embodiment, it is assumed that templates are created by the player. However, preexisting templates may also be distributed by a server or the like. In the present embodiment, a preexisting template is distributed by a server depending on an event (e.g., protecting the city from an enemy character) happening in the city building game. The player applies the template distributed by the server, to a predetermined area within his/her own game space, moves and adds facilities as necessary, and thus prepares for the event. After a certain time has passed, the event happens, and the player is given various rewards (e.g., templates, facilities, etc.) depending on the outcome. Such a template can also be understood as a task given to the player in an event.

Since the schematic configuration of the game system 1 is the same as illustrated in FIG. 1, a description thereof is omitted.

Figure 12:
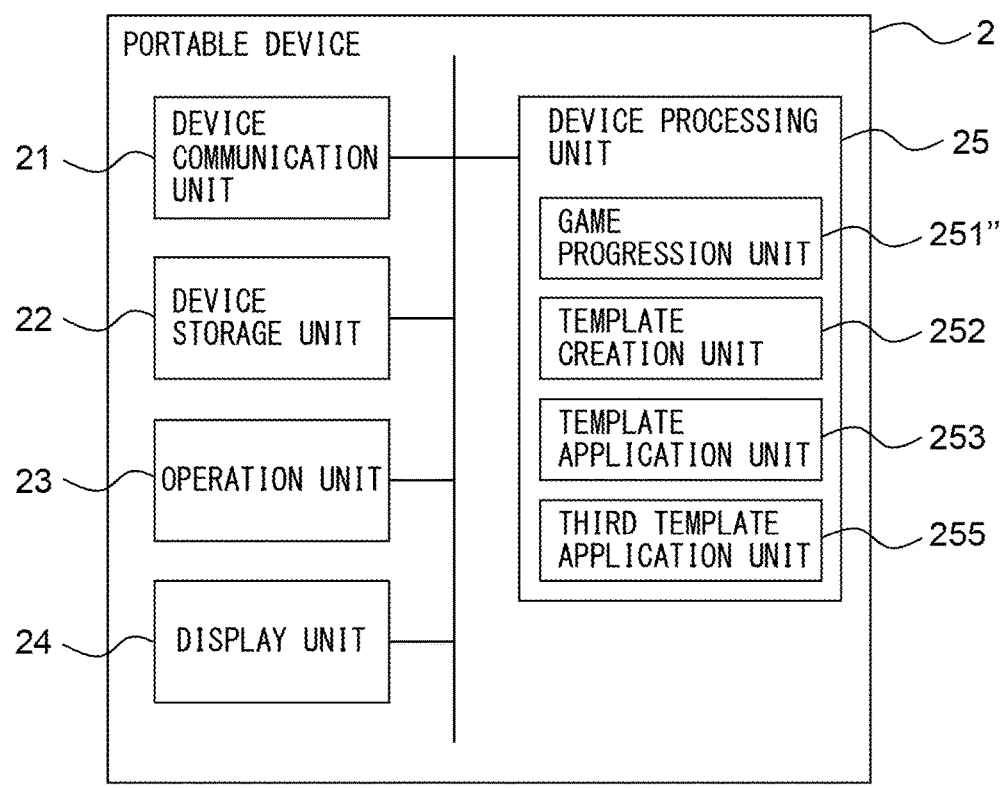
FIG. 12 illustrates an example of a schematic configuration of the portable device according to the third embodiment.

FIG. 12 illustrates an example of a schematic configuration of the portable device 2.

The portable device 2 progresses the game in response to an operation of an operation unit 23 by a player. When necessary, the portable device 2 is connected to the server 3 via the base station 4, the mobile communication network 5, the gateway 6, and the Internet 7, to communicate with the server 3. In order to implement the foregoing functions, the portable device 2 includes a device communication unit 21, a device storage unit 22, the operation unit 23, a display unit 24, and a device processing unit 25.

Since the device communication unit 21, the device storage unit 22, the operation unit 23, and the display unit 24 are the same as illustrated in FIG. 2A, a description thereof is omitted.

The device processing unit 25 includes one or more processors and their peripheral circuits. The device processing unit 25 is, for example, a CPU, and integrally controls an overall operation of the portable device 2. The device processing unit 25 controls operations of the device communication unit 21, the display unit 24, etc., so that various types of processing of the portable device 2 are executed in an appropriate order in accordance with the programs stored in the device storage unit 22, the operation of the operation unit 23, etc. The device processing unit 25 executes processing based on the programs (the operating system program, the driver program, the application program, etc.)

stored in the device storage unit 22. The device processing unit 25 can execute multiple programs (application programs, etc.) in parallel.

The device processing unit 25 includes a game progression unit 251", a template creation unit 252, a template application unit 253, and a third template application unit 255. All of these units are functional modules implemented by a program executed on a processor provided in the device processing unit 25. Alternatively, these units may also be provided as firmware on the portable device 2.

Since the template creation unit 252 and the template application unit 253 are the same as illustrated in FIG. 2A, a description thereof is omitted.

In the following, processing by the game progression unit 251" will be described.

The game progression unit 251" controls the start and progression of the game, and appropriately gives commands to execute processing to the template creation unit 252, template application unit 253, third template application unit 255, etc.

Specifically, when a command to start the game is given by the player via the operation unit 23, the game progression unit 251" displays the game progression screen 300.

When a command to create a template is given by the player via the operation unit 23, the game progression unit 251" gives a command to execute processing to the template creation unit 252.

When a command to apply a template is given by the player via the operation unit 23, the game progression unit 251" gives a command to execute processing to the template application unit 253.

When an event start report is received from the server 3 via the device communication unit 21, the game progression unit 251" gives the third template application unit 255 a command to execute processing, by using the received event start report as a parameter.

When a command to execute different processing is given by the player via the operation unit 23, the game progression unit 251" executes the different processing.

In the following, processing by the third template application unit 255 will be described.

The third template application unit 255 obtains a template for an event from the server 3, and applies the obtained template.

Specifically, the third template application unit 255 obtains a template for an event from the server 3.

In other words, the third template application unit 255 interprets the received event start report, and specifies the ID of the event. Further, when a command to participate in an event is given by the player via the operation unit 23, the third template application unit 255 sends an event participation request via the device communication unit 21 to the server 3 by using the player ID and the specified event ID as parameters. Further, the third template application unit 255 receives an ID and thumbnail image data of a template for the corresponding event, as well as the type ID and position of each facility from the server 3 via the device communication unit 21. The third template application unit 255 then stores the received thumbnail image data in the device storage unit 22. Further, the third template application unit 255 stores the ID of the received template, the file name of the stored thumbnail image data, the received type ID and position of each facility, etc., in the template table stored in the device storage unit 22.

The third template application unit 255 applies the obtained template.

In other words, the third template application unit 255 refers to the facility table stored in the device storage unit 22, and extracts an ID, a type ID and a position within the game space of each facility. The third template application unit 255 counts the number of extracted types of facilities and the number of facilities in each type. The third template application unit 255 further refers to the template table stored in the device storage unit 22 by using the ID of the received template as key, and extracts a type ID and a position within the template of each facility in the corresponding template. The third template application unit 255 counts the number of extracted types of facilities and the number of facilities in each type. Moreover, the third template application unit 255 converts the extracted positions within the template to positions within the game space based on coordinates of the area selected by the player via the operation unit 23. For each type of facility, the third template application unit 255 compares the number of facilities of this type within the game space and the number of facilities of this type within the template, and, according to the result, moves the facilities of this type within the game space to the positions of the facilities of this type within the template.

Then, the third template application unit 255 terminates the processing.

FIG. 13A illustrates one possible schematic configuration of the server 3.

In response to requests from the portable device 2, the server 3 registers and provides templates. Further, the server 3 manages events and provides templates. In order to achieve such functions, the server 3 is provided with a server communication unit 31, a server storage unit 32', and a server processing unit 33.

Since the server communication unit 31 is the same as illustrated in FIG. 5A, a description thereof is omitted.

The server storage unit 32' includes at least one of a magnetic tape device, a magnetic disk device and an optical disk device, for example. The server storage unit 32' stores an operating system program, a driver program, an application program, data, etc., used for processing in the server processing unit 33. The server storage unit 32' stores, for example, a game control program, etc., for registering and providing templates and managing events, as the application program. The server storage unit 32' stores a player table (FIG. 5B) for managing players, a template table (FIG. 5C) for managing templates, an event table for managing events (FIG. 13B), and image data, video data, etc., relating to the players, templates, etc., as the data. Further, the server storage unit 32' may store temporary data relating to certain processing.

FIG. 13B depicts an event table. In the event table, an event ID, starting date and time, an ID of a template to be used, an ID of a participating player, etc., are recorded for each event.

The server processing unit 33 includes one or more processors and their peripheral circuits. The server processing unit 33 is, for example, a CPU, and integrally controls an overall operation of the server 3. The server processing unit 33 controls an operation of the server communication unit 31 or the like so that various types of processing of the server 3 are executed in an appropriate order in accordance with the programs stored in the server storage unit 32'. The server processing unit 33 executes processing based on the programs stored in the server storage unit 32' (the operating system program, the driver program, the application program, etc.). The server processing unit 33 can execute the multiple programs (the application program, etc.) in parallel.

The server processing unit 33 includes a server control unit 331', a template registration unit 332, a template provision unit 333, and an event management unit 334. Each of the units is a functional module implemented by a program to be executed by the processor included in the server processing unit 33. Alternatively, each of the units may be provided as a firmware on the server 3.

Since the template registration unit 332 and the template provision unit 333 are the same as illustrated in FIG. 5A, a description thereof is omitted.

In the following, processing by server control unit 331' will be described.

The server control unit 331' controls the performance of the server and appropriately gives commands to execute processing to the template registration unit 332, template provision unit 333, event management unit 334, etc.

Specifically, when a template registration request is received from the portable device 2 via the server communication unit 31, the server control unit 331' gives the template registration unit 332 a command to execute processing, by using the received template registration request as a parameter.

When a request for providing a template list or a template provision request is received from the portable device 2 via the server communication unit 31, the server control unit 331' gives the template provision unit 333 a command to execute processing, by using the received request for providing a template list or the like as a parameter.

When there is an event whose starting date and time has passed, the server control unit 331' gives the event management unit 334 a command to execute processing, by using the event ID as a parameter.

In other words, the server control unit 331' refers to the event table stored in the server storage unit 32', and extracts an ID and starting date and time of each event. Further, the server control unit 331' obtains the current date and time from a clock (not illustrated). When there is an event whose starting date and time is before the obtained current date and time, the server control unit 331' gives the event management unit 334 a command to execute processing, by using the event ID as a parameter.

When an event participation request is received from the portable device 2 via the server communication unit 31, the server control unit 331' gives the event management unit 334 a command to execute processing, by using the received event participation request as a parameter.

When a different request is received from the portable device 2 via the server communication unit 31, the server control unit 331' executes different processing corresponding to the request.

In the following, processing by the event management unit 334 will be described.

The event management unit 334 sends an event start report to the portable device 2. Further, the event management unit 334 obtains a template for an event from the server storage unit 32', and sends the obtained template to the portable device 2.

Specifically, when an event ID has been received, the event management unit 334 sends an event start report to the portable device 2.

In other words, the event management unit 334 refers to the player table stored in the server storage unit 32', and specifies players. Then, the event management unit 334 sends an event start report via the server communication unit 31 to the portable device 2 of each of the specified players, by using the received event ID as a parameter.

Then, the event management unit 334 terminates the processing.

On the other hand, when an event participation request has been received, the event management unit 334 makes the player participate in the corresponding event.

Specifically, the event management unit 334 interprets the received event participation request, and specifies the ID of the event and the ID of the player. The event management unit 334 then refers to the event table stored in the server storage unit 32' by using the specified event ID as key, and stores the specified player ID as an ID of a player participating in the corresponding event.

The event management unit 334 obtains a template for the corresponding event from the server storage unit 32'.

Specifically, the event management unit 334 refers to the event table stored in the server storage unit 32' by using the specified event ID as key, and extracts an ID of a template for the corresponding event. Then, the event management unit 334 refers to the template table stored in the server storage unit 32' by using the extracted template ID as key, and extracts a file name of thumbnail image data for the corresponding template, as well as the type ID and position of each facility. Further, the event management unit 334 obtains thumbnail image data corresponding to the extracted file name, from the server storage unit 32'.

The event management unit 334 sends the obtained template to the portable device 2.

In other words, the event management unit 334 sends the thumbnail image data of the template as well as the type ID and position of each facility that are obtained or the like, to the portable device 2 via the server communication unit 31.

Then, the event management unit 334 terminates the processing.

Figure 14A:
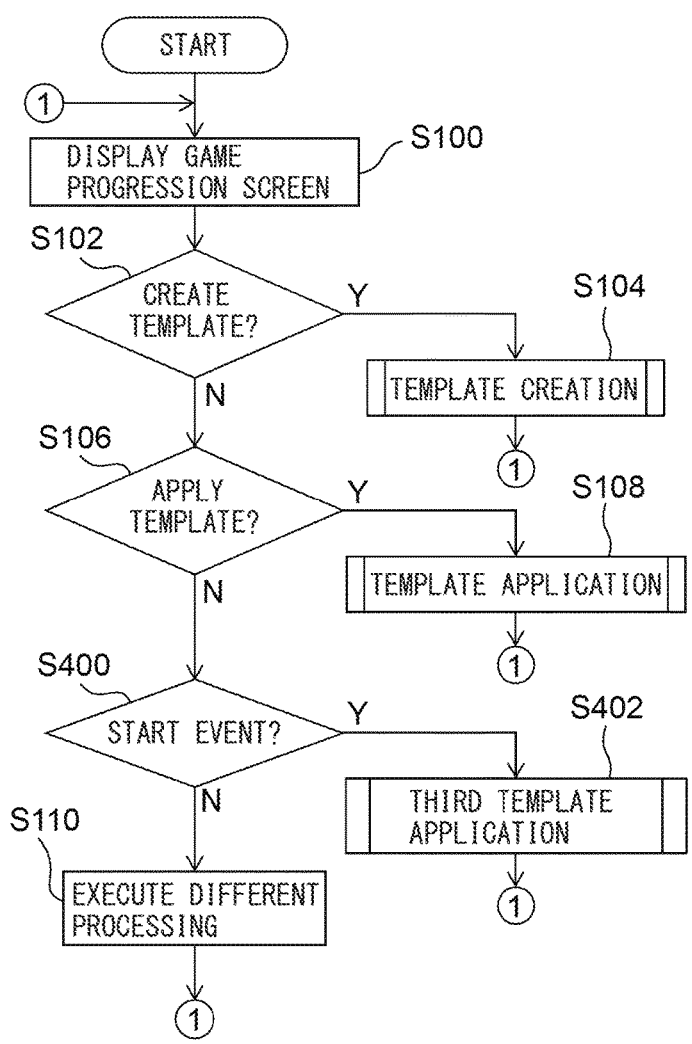
FIGS. 14A and 14B illustrate examples of the operational flow of the portable device.
Figure 14B:
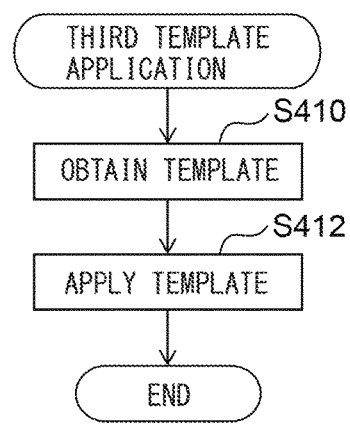

FIGS. 14A and 14B illustrate examples of the operational flow of the portable device 2.

The below-described operational flow is executed, based on a program that is stored in advance in the device storage unit 22, mostly by the device processing unit 25 by working together with each component of the portable device 2.

FIG. 14A illustrates an example of the operational flow of the game progression unit 251".

Since Steps S100 to S108 are the same as illustrated in FIG. 6A, a description thereof is omitted.

When an event start report is received from the server 3 via the device communication unit 21 (Step S400—Yes), the game progression unit 251" gives the third template application unit 255 a command to execute processing, by using the received event start report as a parameter (Step S402).

FIG. 14B illustrates an example of the operational flow of the third template application unit 255.

The third template application unit 255 obtains a template for an event from the server 3, and applies the obtained template (Step S410).

The third template application unit 255 applies the obtained template (Step S412). Then, the third template application unit 255 terminates the processing.

On the other hand, when a command for different processing is given by the player via the operation unit 23 (Step S400—No), the game progression unit 251" executes the different processing (Step S110).

FIGS. 15A to 15C illustrate examples of the operational flow of the server 3.

The below-described operational flow is executed, based on a program that is stored in advance in the server storage unit 32', mostly by the server processing unit 33 by working together with each component of the server 3.

FIG. 15A illustrates an example of the operational flow of the server control unit 331'.

Since Steps S200 to S206 are the same as illustrated in FIG. 7A, a description thereof is omitted.

When there is an event whose starting date and time has passed (Step S500—Yes), the server control unit 331' gives the event management unit 334 a command to execute processing, by using the event ID as a parameter (Step S502).

FIG. 15B illustrates an example of the operational flow of the event management unit 334.

When an event ID has been received, the event management unit 334 sends an event start report to the portable device 2 (Step S510). Then, the event management unit 334 terminates the processing.

On the other hand, when an event participation request is received from the portable device 2 via the server communication unit 31 (Step S504—Yes), the server control unit 331' gives the event management unit 334 a command to execute processing, by using the received event participation request as a parameter (Step S506).

FIG. 15C illustrates another example of the operational flow of the event management unit 334.

When an event participation request has been received, the event management unit 334 makes the player participate in the corresponding event. (Step S520).

The event management unit 334 obtains a template for the corresponding event from the server storage unit 32' (Step S522).

The event management unit 334 sends the obtained template to the portable device 2 (Step S524). Then, the event management unit 334 terminates the processing.

On the other hand, when a different request is received from the portable device 2 via the server communication unit 31 (Step S504—No), the server control unit 331' executes different processing corresponding to the request (Step S208).

As have been described above, by making preexisting templates distributable, it becomes possible to make an event happen in accordance with the arrangement of facilities, which increases the attractiveness of city building games, and makes it possible to continuously attract players to the game.

It should be noted that the present invention is not limited to the above-described embodiment. For example, in the above-described embodiment, it is assumed that a preexisting template is distributed depending on occurrence of an event. But templates may not only be used when an event is happening. During a so-called tutorial that is meant to teach players how to play by arranging various facilities, templates with arrangements for different intended uses, such as balance type, resource protecting type, and so forth may be provided.

Further, in the above-described embodiment, the creation and application of a template are performed by the portable device 2. However, the creation and application may also be performed by the server 3. In this case, the server 3 may store facilities arranged within the game space for each player, and in response to commands by the player, create and/or apply a template to a predetermined area within the game space of the player.

Further, while the above-described embodiment is described by an example wherein positions of facilities are changed based on definition in the template, the types of facilities may be changed.

Further, types are not limited to buildings, walls, fences and so forth, and any other game items such as soldiers and weapons to fight back against an attack by a different player may be applicable.

A computer program for causing a computer to execute the respective functions of the device processing unit 25 and the server processing unit 33 may be provided in a form recorded on a non-transitory computer-readable recording medium such as a semiconductor recording medium, a magnetic recording medium and an optical recording medium, and may be installed on the device storage unit 22 and the server storage unit 32 from the recording medium by using a known set-up program, etc.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

The invention claimed is:

1. A method performed by an information processing system, the method comprising:
    receiving information for reproducing a template for defending an attack initiated by another player, the template defining positions of game contents in a game space and being created by a first terminal executing a game by arranging, based on a player's command, the game contents within the game space, the game contents including at least a game content for defending from an attack initiated by another player;
    storing the received information for reproducing the template; and
    sending, based on the stored information, information for reproducing the template to a second terminal different from the first terminal, the second terminal executing the game by arranging, based on a player's command, game contents within the game space, the game contents including at least a game content for defending from an attack initiated by another player.

2. The method of claim 1, further comprising:
    receiving, at the first terminal, a command from the player to create the template; and
    creating the template defining the game contents and respective positions of the game contents within the game space based on the received command.

3. The method of claim 1, further comprising:
    causing the second terminal to display an interface including an image corresponding to the template;
    receiving a command from the player to select the image corresponding to the template; and
    applying the template corresponding to the received selection to the game space.

4. The method of claim 1, wherein
    the method is performed by at least the first terminal and the second terminal including respective processors configured to execute the method.

5. The method of claim 1, wherein
the method is executed by one or more servers, which include a communication interface configured to communicate with the first terminal and the second terminal via a network.

6. The method of claim 1, wherein
the method is performed by one or more servers communicatively coupled to the first terminal and the second terminal via a network.

7. A method performed by an electronic device, the method comprising:
storing a template used for defending against an attack initiated by another player, the template defining positions within the game space of a plurality of game contents including game contents for defending against the attack by another player;
executing, based on a first command received by a first player, a game by allocating one or more game contents to positions within the game space;
storing types and positions of the one or more game contents allocated in the game space; and
applying the template based on a second command received from the first player by allocating the game contents allocated in the game space to positions in the game space defined by the template.

8. The method of claim 7, wherein
a number of the plurality of game contents included in the template is equal to the number of game contents allocated in the game space.

9. The method of claim 7, further comprising:
comparing a number of the plurality of game contents included in the template with a number of the game contents allocated in the game space; and
allocating the game contents allocated in the game space to positions in the game space defined by the template when the number of the plurality of game contents included in the template is equal to the number of the game contents allocated in the game space.

10. The method of claim 7, further comprising:
storing a type corresponding to each of the plurality of game contents included in the template.

11. The method of claim 10, further comprising:
allocating the game contents allocated in the game space to positions in the game space defined by the template based on the type of each of the plurality of the game contents included in the template and the type of each of the game content allocated in the game space.

12. The method claim 7, further comprising:
applying the template by moving the one or more game contents allocated in the game space to the positions within the game space of the plurality of game contents defined by the template.

13. An electronic device comprising:
circuitry configured to
execute, based on a game execution command received by a first player, an electronic game by allocating one or more game contents to positions within the game space;
identify positions of the game contents arranged in the game space of the electronic game;
create a template identifying the game contents and defining positions of one or more of the game contents arranged in the game space based on a received template creation command from the first player, wherein the template is for defending an attack initiated by another player;
store the created template in a memory of the electronic device; and
apply the template to the game space by allocating one or more game contents to the positions defined by the template based on a received template application command from the first player.

14. The electronic device of claim 13, wherein
the circuitry is configured to create a plurality of templates each defining the game contents and positions of the game contents arranged in the game space.

15. The electronic device of claim 14, wherein
the circuitry is configured to select one of the created templates based on a received template selection command from the first player, and
applying the template includes applying the selected one of the created templates to the game space.

16. The electronic device of claim 13, wherein
the circuitry is configured to register the created template to the server by transmitting information corresponding to the created template to a server via a communication interface of the electronic device.

17. One or more non-transitory computer readable media, including computer-program instructions, which when executed by an electronic device, cause the electronic device to:
execute, based on a game execution command received by a first player, an electronic game by allocating one or more game contents to positions within the game space;
identify positions of the game contents arranged in the game space of the electronic game;
create a template identifying the game contents and defining positions of one or more of the game contents arranged in the game space based on a received template creation command from the first player, wherein the template is for defending an attack initiated by another player;
store the created template in memory of the electronic device; and
apply the template to a game space by allocating one or more game contents to the positions defined by the template based on a received template application command from the first player.

18. The one or more non-transitory computer readable media of claim 17, wherein the computer-program instructions, when executed by the electronic device, cause the electronic device to:
create a plurality of templates each defining the game contents and positions of the game contents arranged in the game space.

19. The one or more non-transitory computer readable media of claim 18, wherein the computer-program instructions, when executed by the electronic device, cause the electronic device to:
select one of the created templates based on a received template selection command from the first player, wherein
applying the template includes applying the selected one of the created templates to the game space.

20. The one or more non-transitory computer readable media of claim 17, wherein the computer-program instructions, when executed by the electronic device, cause the electronic device to:
register the created template to a server by transmitting information corresponding to the created template to the server via a communication interface of the electronic device.

* * * * *